(12) United States Patent　　(10) Patent No.:　　US 8,407,104 B2
Lu et al.　　(45) Date of Patent:　　*Mar. 26, 2013

(54) CATALOG BASED PRICE SEARCH

(75) Inventors: Charles Lu, Fremont, CA (US);
Sadashiv Adiga, Hercules, CA (US)

(73) Assignee: Campusi, Inc., Fremont, CA (US)

( * ) Notice: Subject to any disclaimer, the term of this patent is extended or adjusted under 35 U.S.C. 154(b) by 1099 days.

This patent is subject to a terminal disclaimer.

(21) Appl. No.: 11/450,520

(22) Filed: Jun. 9, 2006

(65) Prior Publication Data

US 2007/0294149 A1　　Dec. 20, 2007

(51) Int. Cl.
*G06Q 30/00*　　(2012.01)
(52) U.S. Cl. ........... 705/26.64; 705/26.1; 705/26.63; 705/26.7; 705/27.1; 705/27.2
(58) Field of Classification Search ........... 705/26.1, 705/26.64, 27.2
See application file for complete search history.

(56) References Cited

U.S. PATENT DOCUMENTS

| | | | | |
|---|---|---|---|---|
| 5,745,681 A | * | 4/1998 | Levine et al. | 709/200 |
| 5,774,670 A | * | 6/1998 | Montulli | 709/227 |
| 5,774,868 A | * | 6/1998 | Cragun et al. | 705/10 |
| 5,966,697 A | * | 10/1999 | Fergerson et al. | 705/26 |
| 6,076,071 A | * | 6/2000 | Freeny, Jr. | 705/26 |
| 6,101,482 A | * | 8/2000 | DiAngelo et al. | 705/26 |
| 6,128,600 A | * | 10/2000 | Imamura et al. | 705/27 |
| 6,131,085 A | * | 10/2000 | Rossides | 705/1 |
| 6,405,174 B1 | * | 6/2002 | Walker et al. | 705/14.21 |
| 6,711,581 B2 | * | 3/2004 | Rebane | 707/102 |
| 6,873,968 B2 | * | 3/2005 | Ehrlich et al. | 705/26 |
| 6,976,006 B1 | * | 12/2005 | Verma et al. | 705/27 |
| 2007/0078850 A1 | * | 4/2007 | Aziz et al. | 707/6 |

OTHER PUBLICATIONS

Choi, W. et al., Design and implementation of the concurrency control manager in the main-memory DBMS Tachyon, 2002, Computer Software and Applications Conference, pp. 635-641.*

* cited by examiner

*Primary Examiner* — Bradley B Bayat
(74) *Attorney, Agent, or Firm* — Raj Abhyanker, P.C.

(57) ABSTRACT

A catalog based price search method comprises, among other things, associating a price search data with a particular data classifier of the set of data classifiers using a processor; creating a database having the price search data associated with the particular data classifier of the set of data classifiers, and different price search data associated with different data classifiers of the set of data classifiers; automatically rendering a structured view in a structured format of the set of data classifiers having the particular data classifier and different data classifiers; and processing a payment of an interested party when the structured view develops a patron base above a threshold value; and offering a subscription service on the structured view associated with the interested party when the patron base is above the threshold value.

6 Claims, 28 Drawing Sheets

| ITEM DESCRIPTION 502 | ITEM IDENTIFIER 504 | | | | | | MERCHANT IDENTIFIER 506 | ITEM BRAND 508 | ITEM PRICE 510 | REBATE 512 | OTHER 514 |
|---|---|---|---|---|---|---|---|---|---|---|---|
| | UPC | EAN | SKU | ISBN | PART NUMBER | MODEL NUMBER | | | | | |
| LAPTOP | 2324 | 2112 | 54 | - | 2000UN | 1800 | 1 | ABC ELECTRONIC | $500 | $50 | X,Y |
| BIOGRAPHY OF JOHN DOE | - | - | - | 32423 | - | - | 2 | XYZ BOOKS | $35 | - | Z,Y |
| o | o | o | o | o | o | o | o | o | o | o | o |
| o | o | o | o | o | o | o | o | o | o | o | o |
| o | o | o | o | o | o | o | o | o | o | o | o |

PARAMETERS 516

TABLE 500

FIGURE 5

| MERCHANT DEVICE 104 | SERVER DEVICE 100 | CLIENT DEVICE 106 |
|---|---|---|
| CLASSIFY A SECTION OF THE INVENTORY ON A MERCHANT SITE FOR SPECIAL OFFERING 700 | | |
| | CRAWL THE MERCHANT SITE AND IDENTIFY THE SECTION WITH SPECIAL OFFERING 702 | |
| | COMPARE A SPECIAL OFFERINGS DATA WITH AN INVENTORY DATA TO EVALUATE EFFECTIVENESS OF A DEAL ASSOCIATED TO THE SPECIAL OFFERINGS DATA FOR A PARTICULAR ITEM 704 | |
| PERMIT INDEXING OF THE SECTION CARRYING THE SPECIAL OFFERING 706 | | |
| | PROCESS THE SPECIAL OFFERING DATA TO CREATE A DEAL INDEX 708 | |
| | | COMMUNICATE A ITEM QUERY FOR A PARTICULAR ITEM 710 |
| | ANALYZE THE ITEM QUERY USING THE DEAL INDEX TO IDENTIFY DEALS ASSOCIATED TO THE PARTICULAR ITEM 712 | |
| | RANK THE IDENTIFIED DEALS AND GENERATE A CLUSTERED REPRESENTATION OF THE DEALS 714 | |
| | | MAKE AN INFORMED SELECTION USING THE RANKING 716 |
| | GENERATE A TRANSACTION DATA BASED ON THE SELECTION 718 | |
| PROCESS THE TRANSACTION DATA AND PROCESS CONSIDERATION OF CLIENT DEVICE 720 | | |

FIGURE 7

| ITEM DESCRIPTION 1502 | ITEM IDENTIFIER 1504 | | | | | | MERCHANT IDENTIFIER 1506 | ITEM BRAND 1508 | OTHER 1510 |
|---|---|---|---|---|---|---|---|---|---|
| | UPC | EAN | SKU | ISBN | PART NUMBER | MODEL NUMBER | | | |
| LAPTOP | 2324 | 2112 | - | - | 2000UN | 1800 | 1 | ABC ELECTRONIC | X,Y |
| BIOGRAPY OF JOHN DOE | - | - | 54 | 32423 | - | - | 2 | XYZ BOOKS | Z,Y |
| ○ | ○ | ○ | ○ | ○ | ○ | ○ | ○ | ○ | ○ |
| ○ | ○ | ○ | ○ | ○ | ○ | ○ | ○ | ○ | ○ |
| ○ | ○ | ○ | ○ | ○ | ○ | ○ | ○ | ○ | ○ |

SET OF META-DATA ATTRIBUTES 1512

TABLE 1500

FIGURE 15

| MERCHANT DEVICE 1204 | SERVER DEVICE 1200 | CLIENT DEVICE 1206 |
|---|---|---|
| COMMUNICATE AN INVENTORY DATA TO A SERVER DEVICE 1600 | | |
| | CONVERT THE INVENTORY DATA TO A STRUCTURED FORMAT 1602 | |
| | PROCESS THE INVENTORY DATA AND CREATE AN INDEX 1604 | |
| | | COMMUNICATE A USER QUERY 1606 |
| | ANALYZE THE USER QUERY USING THE INDEX TO CREATE A QUERY RESPONSE 1608 | |
| | SELECTIVELY GROUP THE QUERY RESPONSE TO CREATE DATA CLUSTERS 1610 | |
| | ORGANIZE THE DATA CLUSTERS ACCORDING TO POPULARITY OF ITEM (E.G., BASED ON A COUNT OF VARIOUS MERCHANTS OFFERING THE ITEM) 1612 | |
| | | MAKE AN INFORMED SELECTION USING THE DATA CLUSTERS 1614 |
| | GENERATE A TRANSACTION DATA BASED ON THE SELECTION 1616 | |
| PROCESS THE TRANSACTION DATA AND PROCESS CONSIDERATION OF CLIENT DEVICE 1618 | | |

FIGURE 16

CATALOG BASED PRICE SEARCH

FIELD OF TECHNOLOGY

This disclosure relates generally to the technical fields of computer technology and, in one example embodiment, to a catalog based price search method, apparatus, and system.

BACKGROUND

A potential buyer may search (e.g., through an Internet) for merchandise through a variety of mechanisms (e.g., querying a search engine, querying a merchant website, etc.). When using the Internet, the potential buyer may browse offerings in a catalog of a merchant. Once the potential buyer finds an offering that the potential buyer wishes to consider purchasing in the catalog of the merchant, the potential buyer may use a price search tool (e.g., Froogle®) to compare prices of the offering across many different merchants.

The price search tool may require the potential buyer to enter a name of the offering. If the potential buyer does not know the name of the offering, the price search tool may be unusable to the potential buyer. In addition, the potential buyer may not be able to browse items in the price search tool because the price search tool may not provide relevant information when the potential buyer is unsure of a specific offering that the potential buyer is looking for.

SUMMARY

A catalog based price search method, apparatus, and system are disclosed. In one aspect a method includes generating a set of data classifiers based on an offering classification, associating a price search data with a particular data classifier of the set of data classifiers, creating a database having the price search data associated with the particular data classifier of the set of data classifiers, and different price search data associated with different data classifiers of the set of data classifiers, and automatically rendering a structured view in a structured format of the set of data classifiers having the particular data classifier and different data classifiers.

The method may include identifying a special offering data of the price search data when an identification data of the price search data is matched with a deal marker data, comparing the special offering data with a parameter of a known offering data to determine a substantial match between the special offering data and the known offering data, creating a separate structured view of the special offering data, and periodically indexing the special offering data in the separate structured view when the special offering data has a distinctive competitive advantage when compared with the known offering data. The distinctive competitive advantage may be a lower selling price, a faster shipping time, a larger available stock, a geographic proximity, a credibility rating, and/or a quality metric when compared to an industry benchmark (e.g., may be periodically refreshed through an automatic comparison of the special offering data with the known offering data of a number of merchants).

In addition, the method may automatically populate the deal marker data by evaluating the price search data through an algorithm that compares each offering on the price search data with a market value of the each offering, such that the deal marker data is an identifier data associated with the special offering data having a selling price lower than a threshold value from the known offering data (e.g., the threshold value may be less than 10% below the market value of the known offering data).

The method may include generating a clustered representation of the special offering data through an other algorithm that considers a grouping preference using a meta-data comparison with the item query, and an absolute value of individual merchants offering items of the special offering data. Also, a payment of an interested party may be processed when the structured view develops a patron base above a threshold value, and a subscription service (e.g., an advertisement space, a sponsored recommendation, a web feature, etc.) may be offered on the structured view associated with the interested party when the patron base is above the threshold value.

In another aspect, a method may include processing a selection of a data classifier in an offering category area, simultaneously accessing a price search data aggregated from external offering providers when processing the selection of the data classifier, and generating a clustered representation of the price search data through an algorithm that considers a grouping preference using a meta-data comparison with the data classifier, and an absolute value of individual merchants offering the price search data and other price search data.

The method may also include segregating a portion of the price search data as a special offering data, placing the special offering data in a separate mark-up language document, and permitting an indexing of the separate mark-up language document when the special offering data has a distinctive competitive advantage over a standard market offering data identifying a substantially similar offering. A verified transaction data may be processed through a server device when a user of a deal index of the server device discovers the special offering data through an item query of the deal index. The clustered representation may be created using an incremental algorithm that builds on preexisting indexes of the price search data. The external offering providers may self-upload an inventory data having items that contribute to the price search data.

In yet another aspect, a system includes a number of merchant devices to periodically provide a merchant-uploaded inventory data, a structured catalog server to determine a set of meta-data attributes associated with the merchant-uploaded inventory data, to classify the merchant-uploaded inventory data based on a set of data classifiers, and to render a structured catalog view of the set of data classifiers having the merchant-uploaded inventory data and other price search data aggregated across a number of merchants, and a number of client devices communicatively coupled to the structured catalog server through a network to access the structured catalog view of the structured catalog server, and to transact with the number of merchants through a selection referenced through the structured catalog server.

The structured catalog server may include a set of category style sheets each having a customized version of the set of data classifiers most appropriate to a particular one of the set of category style sheets. The structured catalog server may enable a user of the number of client devices to browse a catalog of offerings that are discovered on a characteristic basis rather than a name basis, and whose prices are compared across the number of merchant devices.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 5 is a table view of the deal index of FIG. 2, according to one embodiment.

FIG. 7 is an interaction diagram of a process flow between the server device, the merchant device and the client device, according to one embodiment.

FIG. 15 is a table view of content of index data of FIG. 12, according to one embodiment.

FIG. 16 is an interaction diagram of a process flow between the server device, the merchant device and the client device, according to one embodiment.

Other features of the present embodiments will be apparent from the accompanying drawings and from the detailed description that follows.

DETAILED DESCRIPTION

A catalog based price search method, apparatus, and system are disclosed. In the following description, for the purposes of explanation, numerous specific details are set forth in order to provide a thorough understanding of the various embodiments. It will be evident, however to the one skilled in the art that the various embodiments may be practiced without these specific details.

Figure 24:
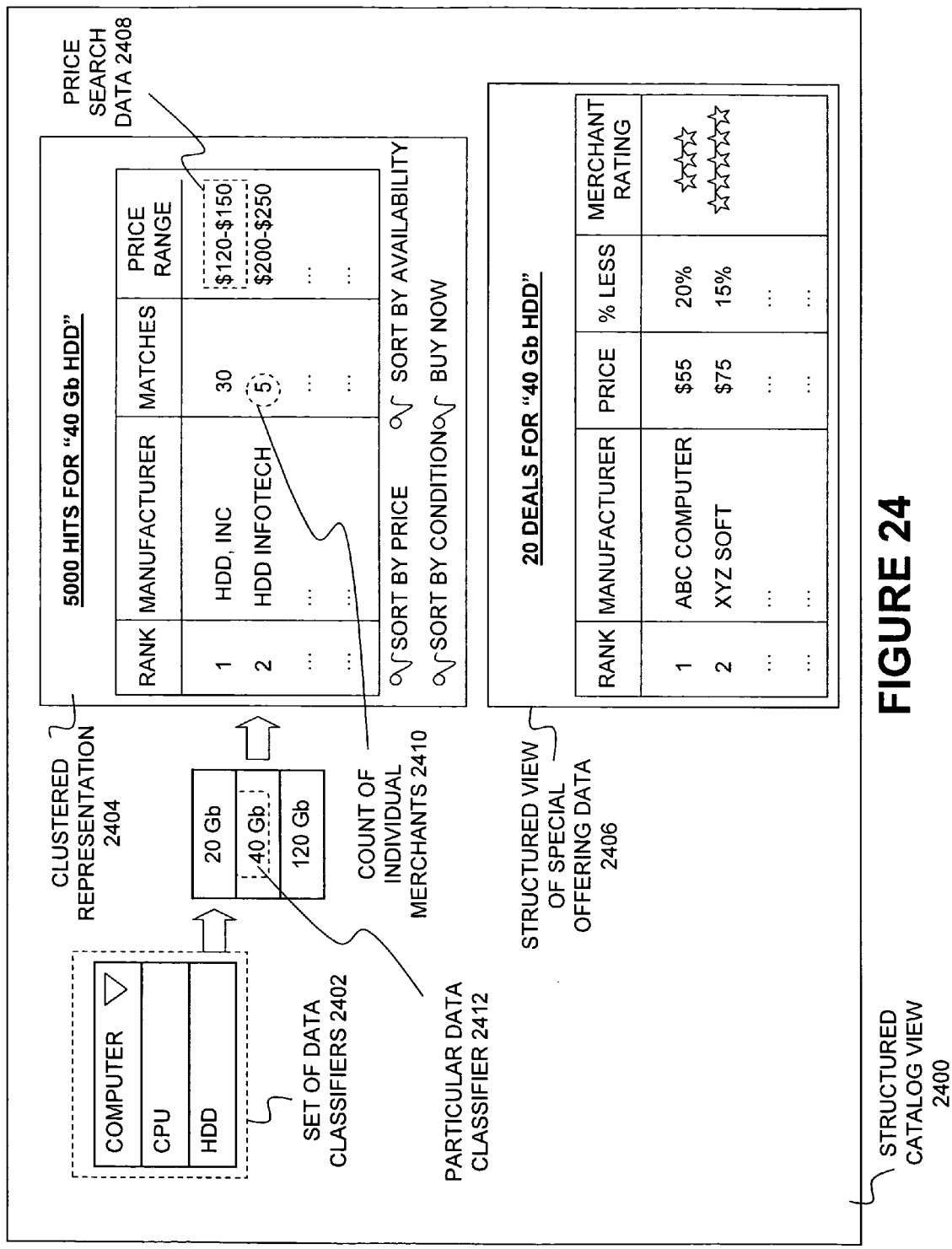
FIG. 24 is a user interface view of the catalog view generator module of FIG. 17, according to one embodiment.

In one embodiment a method includes generating a set of data classifiers 2402 (e.g., the set of data classifiers 2402 of FIG. 24) based on an offering classification, associating a price search data 2408 (e.g., the price search data 2408 of FIG. 24) with a particular data classifier 2412 (e.g., the particular data classifier 2412 of FIG. 24) of the set of data classifiers 2402, creating a database (e.g., a data-mart) having the price search data 2408 associated with the particular data classifier 2412 of the set of data classifiers 2402, and different price search data associated with different data classifiers of the set of data classifiers 2402, and automatically rendering a structured view (e.g., as illustrated in FIG. 24) in a structured format of the set of data classifiers 2402 having the particular data classifier 2412 and the different data classifiers.

Another example embodiment a method includes processing a selection of a data classifier (e.g., the particular data classifier 2412 of FIG. 24) in an offering category area, simultaneously accessing a price search data 2408 aggregated from external offering providers (e.g., merchants) when processing the selection of the data classifier, and generating a clustered representation 2404 (e.g., the clustered representation 2404 of FIG. 24) of the price search data 2408 through an other algorithm (e.g., grouping algorithms, clustering algorithms, etc.) that considers a grouping preference using a meta-data comparison with the data classifier, and an absolute value of individual merchants offering the price search data 2408 and other price search data.

An additional example embodiment a system includes a number of merchant devices to periodically provide a merchant-uploaded inventory data (e.g., a unidirectional inventory data), a structured catalog server (e.g., a catalog server device 1700 of FIG. 17) to determine a set of meta-data attributes associated with the merchant-uploaded inventory data, to classify the merchant uploaded inventory data based on a set of data classifiers 2402, and to render a structured catalog view 2400 (e.g., the structured catalog view 2400 of FIG. 24) of the set of data classifiers 2402 having the merchant-uploaded inventory data and other price search data aggregated across a number of merchants, and a number of client devices communicatively coupled to the structured catalog server through a network 1706 (e.g., the network 1706 of FIG. 17) to access the structured catalog view 2400 of the structured catalog server, and to transact with the number of merchants through a selection referenced through the structured catalog server.

It will be appreciated that the various embodiments discussed herein may/may not be the same embodiment, and may be grouped into various other embodiments not explicitly disclosed herein.

Figure 1:
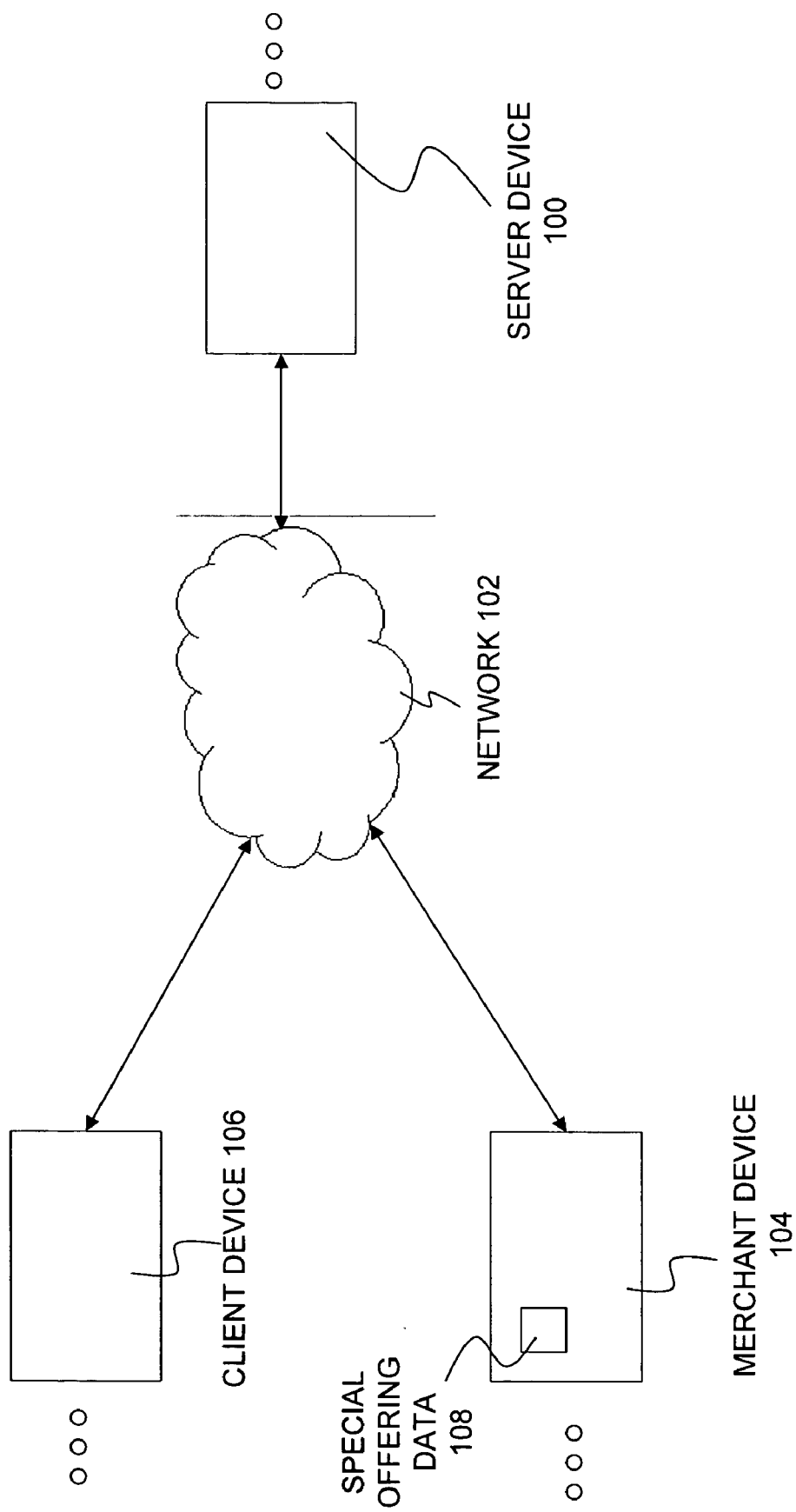
FIG. 1 is a network view of a server device communicating with a merchant device and a client device through a network, according to one embodiment.

FIG. 1 is a network diagram of a server device 100, a merchant device 104 and a client device 106 communicating a special offering data 108 through a network 102 (e.g., an internet network, a wide area network, a local area network, etc.), according to one embodiment. In one embodiment, the merchant device 104 segments a special inventory data (e.g., inventory data that have specials and/or deals associated to them) from other inventory data (e.g., regular inventory data without special pricing and/or deals). The merchant device 104 may place the special offering data 108 (e.g., the special inventory data) in a separate mark-up language document (e.g., a separate webpage dedicated to special offerings and/or deals). The server device 100 may communicate with a plurality of merchant devices (e.g., the merchant device 104) to index (e.g., list) the special inventory data (e.g., the special offering data 108) when a portion of the special inventory data has a market value (e.g., selling price) that is less than a threshold percentage (e.g., a set minimum) as compared to an offer price (e.g., market price) of the portion of the special inventory data, according to one embodiment. The server device 100 is best understood with reference to FIG. 2, as will later be described.

Figure 2:
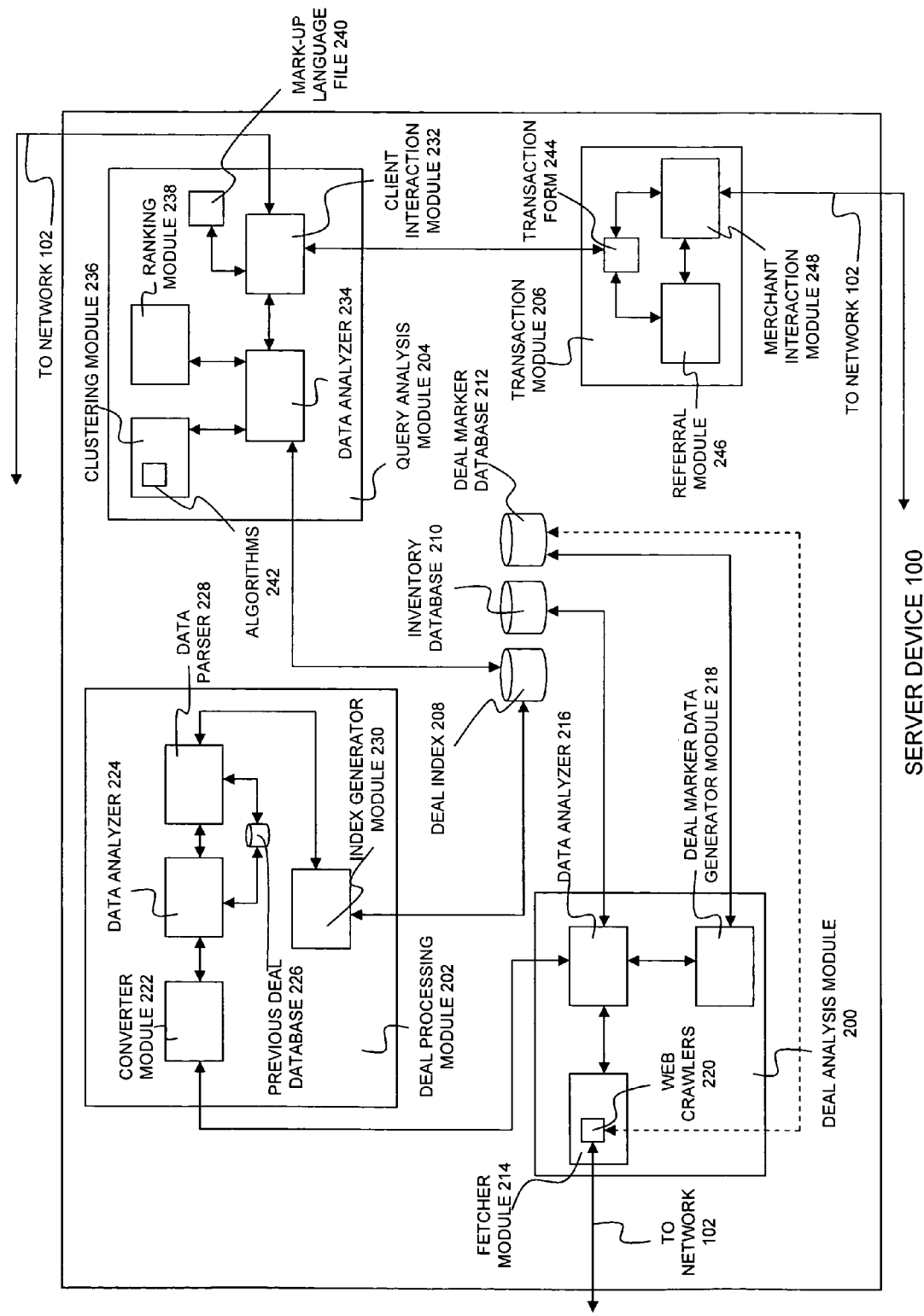
FIG. 2 is a block diagram of the server device of FIG. 1, having a deal analysis module, a deal processing module, a query analysis module, a transaction module a deal index, an inventory database and a deal marker database, according to one embodiment.

FIG. 2 is a block diagram of the server device 100 (e.g., the server device 100 of FIG. 1), having a deal analysis module 200, a deal processing module 202, a query analysis module 204, a transaction module 206 a deal index 208, an inventory database 210 and/or a deal marker database 212, according to one embodiment. The deal analysis module 200 may include a fetcher module 214, a data analyzer 216 and/or a deal marker data generator module 218. In one embodiment the server device 100 identifies a special offering data 108 (e.g., the special offering data 108 of FIG. 1) of a mark-up language site (e.g., a mark-up language site associated to the merchant device 104) when an identification data of the mark-up language site is matched with a deal marker data (e.g., keywords, deal identification data, etc.).

The fetcher module 214 may fetch the special offering data 108 from the merchant device 104. Particularly the web crawlers 220 of the fetcher module 214 may send out crawlers to search mark-up language site(s) associated to the merchant device 104. The web crawlers 220 may reference the deal marker database 212 to identify the special offering data 108 by comparing (e.g., looking for a corresponding match) attributes of the deal marker data (e.g., keywords, deal identification data, etc.) to identification data (e.g., description, headings, etc) of the mark-up language site having the special offering data 108.

The deal marker data generator module 218 may generate deal marker data required to identify the special offering data 108 (e.g., when keywords associated to the deal marker data fail to identify a single special offering data on a merchant web-page). In one embodiment, the deal marker data may be automatically populated (e.g., generated, added and/or updated) by evaluating a previously examined mark-up language site (e.g., a mark-up language file that was previously examined by the fetcher module 214 and did not return any matches for the deal marker data) through an algorithm that compares each offering (e.g., data associated to each item) on the mark-up language site with a market value (e.g., market price) of the each offering (e.g., by referencing the inventory database 210), such that the deal marker data is an identifier data (e.g., the identification data) associated with the special offering data 108 having a selling price lower than a threshold value from the known offering data (e.g., known inventory data).

The threshold value may be less than 10% below the market value of the known offering data (e.g., 10% cheaper than the existing market price). For example, the fetcher module 214 may identify several items on a web page (e.g., with the help of the data analyzer 216 and the inventory database 210) that may be good deals (e.g., equivalent to a special offering data 108) but which are not categorized by the merchant as a special offering data 108. The data analyzer 216 may receive and/or process (e.g., by using the processor 602 of FIG. 6) the special offering data 108 once identified by the fetcher module 214.

The server device 100 compares the special offering data 108 with a parameter (e.g., attributes) of a known offering data (e.g., known inventory data) to determine a substantial match between the special offering data and the known offering data, according to one embodiment. Particularly the substantial match may be determined by the data analyzer 216 by referencing the inventory database 210 and comparing the special offering data 108 to the parameter(s) (e.g., the parameters 516 of FIG. 5) associated to the inventory data (e.g., inventory items in the inventory database 210).

In one embodiment, the server device periodically indexes the special offering data 108 when the special offering data 108 has a distinctive competitive advantage (e.g., in terms of item price, item availability, item quality etc.) when compared with the known offering data. The data analyzer 216 may further analyze the special offering data 108 (e.g., by comparing values associated to the parameters 516 of the special offering data 108 with parameter values associated to the known offering data that match the special offering data 108) to determine and/or identify the distinct competitive advantage.

The distinctive competitive advantage may be a larger available stock, a geographic proximity (e.g., closer to the buyer that may translate to a shorter shipping period), a credibility rating (e.g., merchant credibility, user rating of merchant, etc.), and/or a quality metric (e.g., product quality) when compared to an industry benchmark (e.g., a known industry standard). The industry benchmark may be periodically refreshed (e.g., by refreshing items of the inventory database 210) through an automatic comparison of the special offering data 108 with the known offering data (e.g., associated to known inventory items) of a plurality of merchants (e.g., like the merchant device 104 of FIG. 1). The data analyzer 216 may then communicate the special offering data 108 to the deal processing module 202 for indexation.

The deal processing module 202 may include a converter module 222, a data analyzer 224, a previous deal database 226, a data parser 228 and/or an index generator module 230, according to one embodiment. The converter module 222 may convert the special offering data 108 (e.g., the special offering data 108 communicated by the data analyzer 216) to a structured format (e.g., an organized format and/or a process conducive format) prior to processing of the special offering data 108 having a set of parameters 516 (e.g., the parameters 516 of FIG. 5), according to one embodiment.

The deal processing module may process (e.g., by using a processor 602 of FIG. 6) the special offering data 108 (e.g., the special offering data 108 of FIG. 1) to determine a set of parameters (e.g., the parameters 516 illustrated in FIG. 5)

associated with the special offering data 108. Particularly the set of parameters may be determined by the data analyzer 224 by referencing the previous deal database 226 and carrying out a comparative analysis of the special offering data 108 (e.g., comparison of attributes and/or parameters associated to the special offering data 108 by a merchant to attributes associated to a previous special offering data of the same merchant) to identify a portion of the set of parameters which do not need to be updated (e.g., parameters that are common and/or similar in both the special offering data 108 and the previous special offering data of the previous deal database 226). The set of parameters (e.g., the parameters 516 of FIG. 5) determined by the data analyzer 224 may then be parsed (e.g., extracted) from the special offering data 108 using the data parser 228.

The index generator module 230 may generate a deal index 208 based on a feed (e.g., processed data) supplied by the data parser 228. In one embodiment, a deal index 208 may be formed through periodical indexation of the special offering data 108. Particularly the index generator module 230 may create the deal index 208 by using an incremental algorithm to infuse (e.g., introduce) the set of parameters (e.g., the set of parameters determined by the data analyzer 224) into a preexisting index (e.g., an index having substantially similar data as the deal index 208). Moreover, the special offering data 108 may be a portion of the mark-up language site (e.g., the mark-up language site of the merchant device 104), and only the portion of the mark-up language site having the special offering data 108 may be periodically indexed (e.g., by using the deal marker data).

The query analysis module 204 may include a client interaction module 232, a data analyzer 234, a clustering module 236, a ranking module 238 and/or a mark-up language file 240, according to one embodiment. The client interaction module 232 may serve as an interface between the client device 106 (e.g., the client device 106 in FIG. 1) and the merchant device 104 (e.g., the merchant device 104 of FIG. 1). A user (e.g., a potential buyer) of the client device 106 may post an item query 410 (e.g., search for an item) to the server device 100 through the client interaction module 232.

In one embodiment, the item query 410 (e.g., the item query 410 of FIG. 4) of the client device 106 may be analyzed using the deal index 208 to determine a special item 412 (e.g., the special item 412 of FIG. 4) of the deal index 208 that substantially matches the item query 410. Particularly the item query 410 is received by the data analyzer 234 and analyzed and/or processed (e.g., by using the processor 602 of FIG. 6) by comparing the item query 410 to the deal index 208 (e.g., comparison of specific keywords in the item query 410 to the content associated to the deal index 208) to determine a special item of the deal index 208 (e.g., extract and/or determine a item through a item identifier, item description, item brand, etc. associated to item(s) in the deal index 208) that match (e.g., correspond) to the item query 410.

The ranking module 238 may be used to rank the special item (e.g., the special item 412 of FIG. 4) determined by the data analyzer 234. In one embodiment, a correlation (e.g., a relationship) of the special item with the item query 410 may be evaluated (e.g., based on price, condition, quality, best match, etc.) to determine a ranking (e.g., a rank 402 of FIG. 4) of the special item with other special items (e.g., other items of the deal index 208 that also match the item query 410) identified through the analyzing of the item query 410 (e.g., by the data analyzer 234) of the client device 106 using the deal index 208.

The clustering module 236 may include an algorithms 242, according to one embodiment. The clustering module 236 may generate a clustered representation (e.g., representation of items in the form of item clusters and/or item group formed by logical grouping of the items) of the special item (e.g., the special item 412 of FIG. 4) and the other special items through algorithms 242. Specifically the data analyzer 234 may reference the algorithms 242 (e.g., grouping and/or clustering algorithms) of the clustering module 236 and consider a grouping preference based on a meta-data comparison with the item query 410 (e.g., comparison of attributes of the special item and other special items with the attributes of the item query 410) and an absolute value of individual merchants (e.g., count of unique merchants) offering the special item and the other special items, according to one embodiment. For example, an item being offered by '5' unique merchants may be ranked before a similar item being offered by '2' unique merchants.

Figure 4:
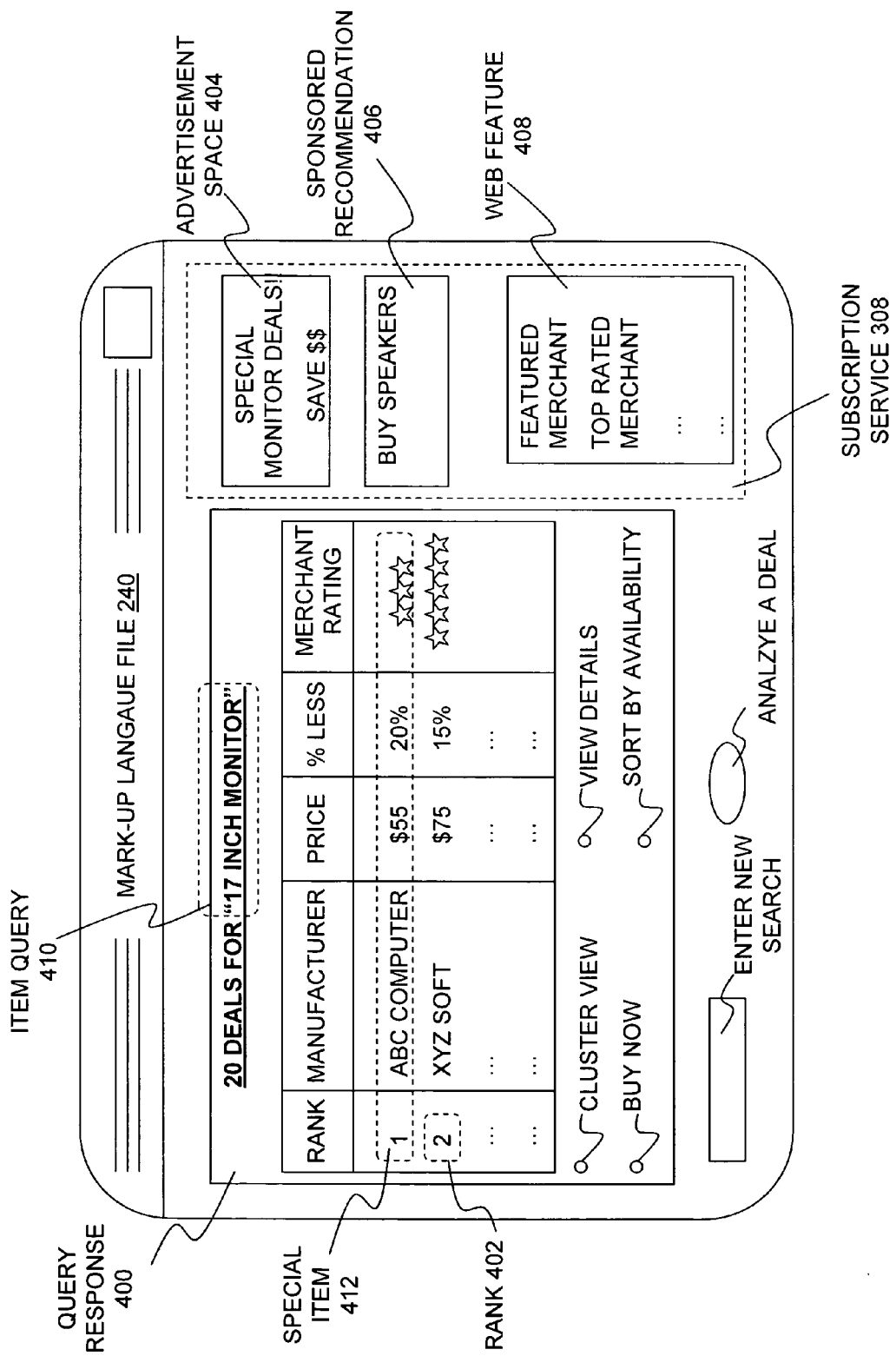
FIG. 4 is a user interface view of the mark-up language file of FIG. 2, according to one embodiment.

The client interaction module 232 may reference the data analyzer 234 and automatically populate a mark-up language file 240 with the clustered representation and/or the ranking correlation of the special item and the other special item in response to the item query (e.g., the item query 410 of FIG. 4). The contents of the mark-up language file 240 may be best understood with reference to FIG. 4, as will later be described.

The transaction module 206 may include a transaction form 244, a referral module 246 and/or a merchant interaction module 248, according to one embodiment. In one embodiment, the transaction module 206 may generate a verified transaction data (e.g., item information, shipping information, price information etc associated to a particular item) based on a selection of the special item (e.g., based on user selection). The transaction form 244 may be used to facilitate transaction(s) (e.g., by permitting a user to enter transaction data in the transaction form 244 which may serve as a template) between a user (e.g., a buyer) and the merchant device 104 (e.g., the merchant device 104 of FIG. 1) through the server device 100 (e.g., the server device 100 of FIG. 1).

The verified transaction data may be communicated (e.g., through the merchant interaction module 248) to a particular merchant (e.g., the merchant device 104 of FIG. 1) through a referral mark-up language page (e.g., by using the referral module 246) which automatically submits the verified transaction data to the particular merchant. In one embodiment the transaction module 206 may generate a statistics 306 (e.g., referral statistics as illustrated in FIG. 3) based on the verified transaction data (e.g., by using the referral module 246 to analyze the verified transaction data and generate a hierarchy of the transactions associated to a merchant) submitted to the particular merchant (e.g., merchant chosen based on user selection of the special item) and allocate a portion of funds (e.g., funds paid by user for the requested item) collected through the verified transaction data to the server device 100 as a referral commission (e.g., a commission for transaction services rendered to the merchant device 104).

The transaction module 206 may process a payment of an interested party (e.g., a merchant, a service vendor, etc.) when the mark-up language file 240 develops a patron base (e.g., a user base) above a threshold value (e.g., a set minimum) and may offer a subscription service 308 (e.g., the subscription service 308 of FIG. 4) on the mark-up language file 240 associated with the interested party (e.g., an advertisement of the interested party) when the patron base is above the threshold value, according to one embodiment. The merchant interaction module 248 may serve as an interface between the merchant device 104 and the client device 106 to process, manage client-merchant and/or server-merchant interactions (e.g., communicate transaction data, manage merchant relationships, etc.). Other aspect of the merchant interaction module 248 may be best understood with reference to FIG. 3, as will later be described.

Figure 3:
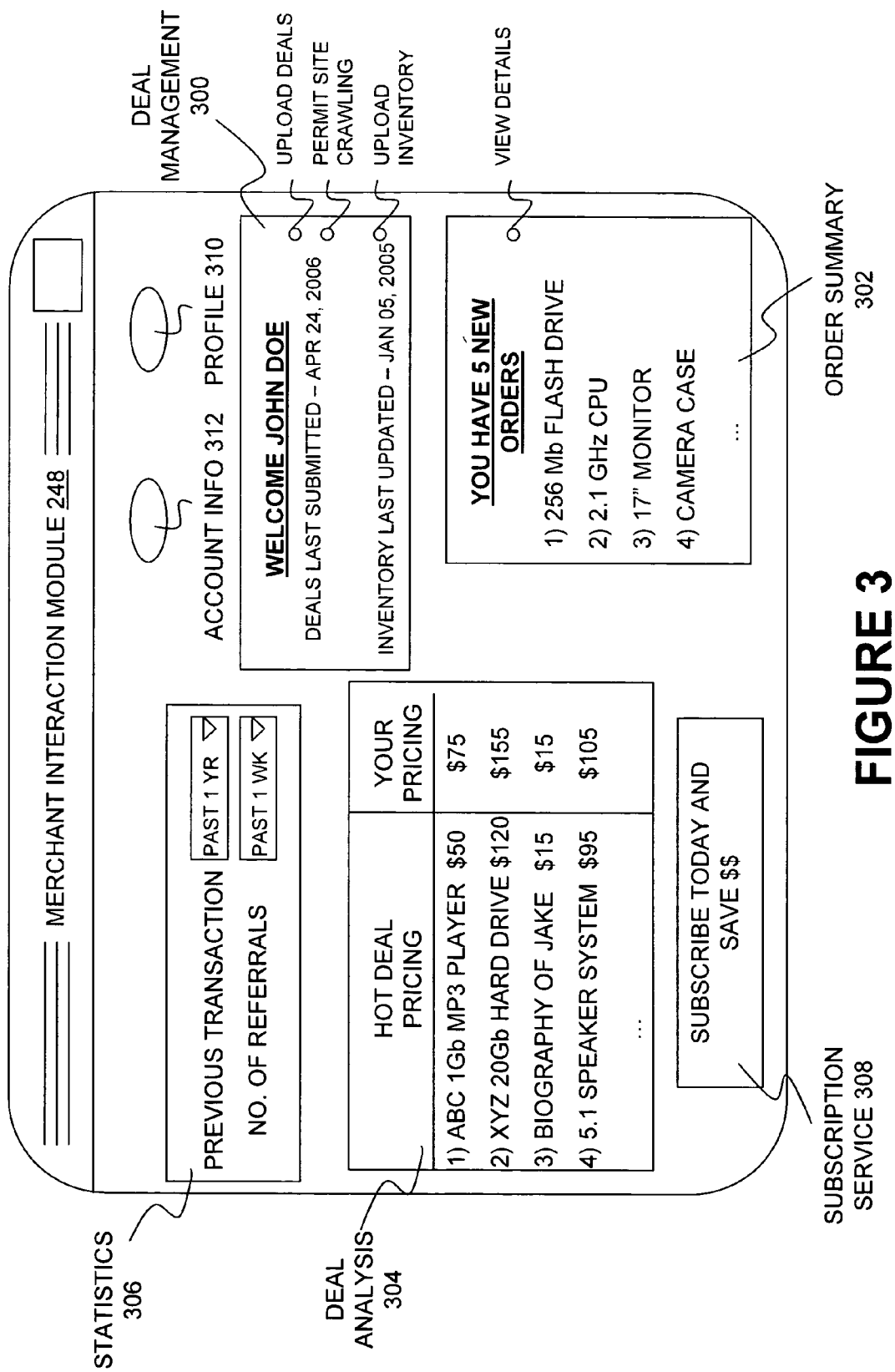
FIG. 3 is a user interface view of the merchant interaction module of FIG. 2, according to one embodiment.

FIG. 3 is a user interface view of the merchant interaction module 248 of FIG. 2, according to one embodiment. The user interface view may include a deal management view 300, an order summary view 302, a deal analysis view 304, statistics 306, a subscription service 308, a profile view 310 and/or an account information view 312. The deal management view 300 may provide a summary (e.g., a time stamp of deals last updated and/or submitted, number of deals indexed, current inventory size, etc.) related to the special offering data (e.g., the special offering data 108 of FIG. 1) identified by the server device 100.

The deal management view 300 may also allow the merchant device 104 to set and/or change site crawling permissions (e.g., permission to search merchant site for special offering data 108). The order summary view 302 may provide a summary (e.g., a list and/or detailed information) of orders (e.g., special items purchased by user(s)) generated from the verified transaction data based on selection of particular special item(s) by the user(s) (e.g., a buyer). The deal analysis view 304 may provide an analysis of the special offering data 108 identified on the mark-up language site (e.g., the mark-up language site associated to the merchant device 104). For example, the analysis may provide a list of special offering items (e.g., hot deals, special deals, etc. illustrated by 'ABC 1 Gb mp3 player' '$50' in the Figure) and compare the list to the special offering data 108 (e.g., '$75' for the 'ABC 1 Gb mp3 player' as illustrated in the Figure) of the merchant device 104 to check and/or compare deals offered by the merchant device 104 with the list of special offering items (e.g., hot deals, special deals, etc.).

The statistics 306 may provides a statistical analysis (e.g., number of user referrals, preference of users, etc.) of users referred to the merchant device 104 through the server device 100. The statistical analysis may be generated though the verified transaction data (e.g., as described in FIG. 2). The subscription service 308 may allow a merchant to sign-up and/or subscribe to a subscription service 308 (e.g., a paid service as illustrated in FIG. 4) offered by the server device 100. The subscription service 308 may be an advertisement space 404 (e.g., the advertisement space 404 of FIG. 4), a sponsored recommendation 406 (e.g., the sponsored recommendation 406 of FIG. 4) and/or a web feature 408 (e.g., the web feature 408 of FIG. 4). The account information view 312 may display subscription information about the merchant (e.g., balance, account preference, etc.). The profile view 310 may include data about the merchant (e.g., name, address, email address and/or transaction preference, etc.).

FIG. 4 is a user interface view of the mark-up language file 240 of FIG. 2, according to one embodiment. The user interface view may include a query response 400, a rank 402, an advertisement space 404, a sponsored recommendation 406, a web feature 408, an item query 410 and/or a special item 412. The query response 400 provides a summary (e.g., a result summary) of the query response 400 generated by the data analyzer 234 (e.g., as described in FIG. 2) in response to the item query (e.g., the item query 410) posted by a user. The special item 412 may be the special item that substantially matches the item query (e.g., the item query 410) determined based on the analysis of an item query (e.g., by the data analyzer 234 as illustrated in FIG. 2) of a client device (e.g., the client device 106 of FIG. 1) using the deal index (e.g., the deal index 208 of FIG. 2). For example, the special item 412 shows a '17 inch monitor' manufactured by 'ABC Computer' with a price of '$55', which is '20%' lower than the known offering rate (e.g., based on the inventory database 210 determined by the data analyzer 216 of FIG. 1) offered by a merchant having a rating of '3 stars'.

The rank 402 shows the rank for a special item. The rank 402 shows the ranking for a special item (e.g., the special item 412) as determined by an evaluation of correlation between the special item and the item query with respect to other special items (e.g., as described by the ranking module 238 of FIG. 2). For example, as illustrated in the Figure, the special item '17 inch monitor' manufactured by 'ABC Computer' has a price of '$55' which is '20%' less than offering price (e.g., of an equivalent item in the inventory database 210 of FIG. 1) compared to the '17 inch monitor' manufactured by 'XYZ soft' which has a value of '15%' less than the offering price. Hence the special item '17 inch monitor' manufactured by 'ABC Computer' is ranked before the special item '17 inch monitor' manufactured by 'XYZ Online'.

The advertisement space 404 may be a place for displaying advertisements of an interested party (e.g., a merchant) who may have subscribed for subscription service 308 (e.g., the subscription service 308 of FIG. 3). The sponsored recommendation 406 may be an area on the mark-up language file 240 (e.g., the mark-up language file 240 of FIG. 2) for displaying recommendations (e.g., specific recommendations based on user query) of an interested party (e.g., a merchant) who may have signed-up for subscription service 308. The web feature 408 may be a section on the mark-up language file 240 to promote an interested party (e.g., through merchant ratings, special merchant features, etc.) who may have opted for the subscription service 308.

FIG. 5 is a table view of content of the deal index 208 of FIG. 1, according to one embodiment. The table 500 in FIG. 5 may include an item description field 502, an item identifier field 504, a merchant identifier field 506, an item brand field 508, an item price field 510, a rebate field 512 and/or an other field 514. Parameters 516 associated with the special offering data 108 (e.g., the special offering data 108 of FIG. 1) may be an item identifier (e.g., a SKU number, a UPC number, a model number, a part number etc.), an item description (e.g., item name, specification, etc.), a merchant identifier (e.g., an identity tag associated to a merchant) and/or an item brand (e.g., item make, manufacturer, etc.).

The item description field 502 may be a name and/or a description tag associated with a special item (e.g., the special item 412 of FIG. 4). The item identifier field 504 may be reference identifier (e.g., information to identify and/or distinguish an item) associated with the special item. The merchant identifier field 506 may be a reference tag associated to a particular merchant to keep a track of special items offered by the particular merchant. The item brand field 508 may be a brand name and/or a brand description tag associated with the special item. The item price field 510 may be a price associated with the special item. The rebate field 512 may be a refund and/or discount associated to the special item. The other field 514 may indicate miscellaneous and/or additional information relevant to the special item.

For example, two special items are illustrated in FIG. 5 (e.g., 'Laptop' and 'Biography of John Doe'). The special item 'Laptop' has a UPC value '2324', EAN value '2112', SKU value '54', part number value '2000UN', model number '1800' in the item identifier field 504 indicating reference identifier(s) (e.g., a universal product code, a european article number, a store keeping unit, item part number, item model number etc.) associated with 'Laptop'. The merchant identifier field 506 has a value '1' indicating the merchant reference number associated with the special item 'Laptop'. The item brand field 508 has a value 'ABC Electronic' indicating the brand name associated with the special item 'Laptop'. The item price field 510 has a value of '$500' indicating the price of the special item. The rebate field 512 has a value of '$50' indicating a refund and/or a discount on the special item 'Laptop'. In addition special item 'Laptop' includes 'X, Y' in the other field 514, indicating any supplemental information that may be relevant to the item 'Laptop'.

Item 'Biography of John Doe' has an ISBN value '32423' in the item identifier field 504 indicating the reference identifier (e.g., international standard book number) associated with 'Biography of John Doe'. The merchant identifier field 506 has a value '2' indicating the merchant reference number associated with the item 'Biography of John Doe'. The item brand field 508 has a value 'XYZ Books' indicating the publisher name associated with the item 'Biography of John Doe'. The item price field 510 has a value '$35' indicating the price associated with the item 'Biography of John Doe'. In addition item 'Biography of John Doe' includes 'Z, Y' in the other field 514, indicating any supplemental information that may be relevant to the item 'Biography of John Doe'.

Figure 6:
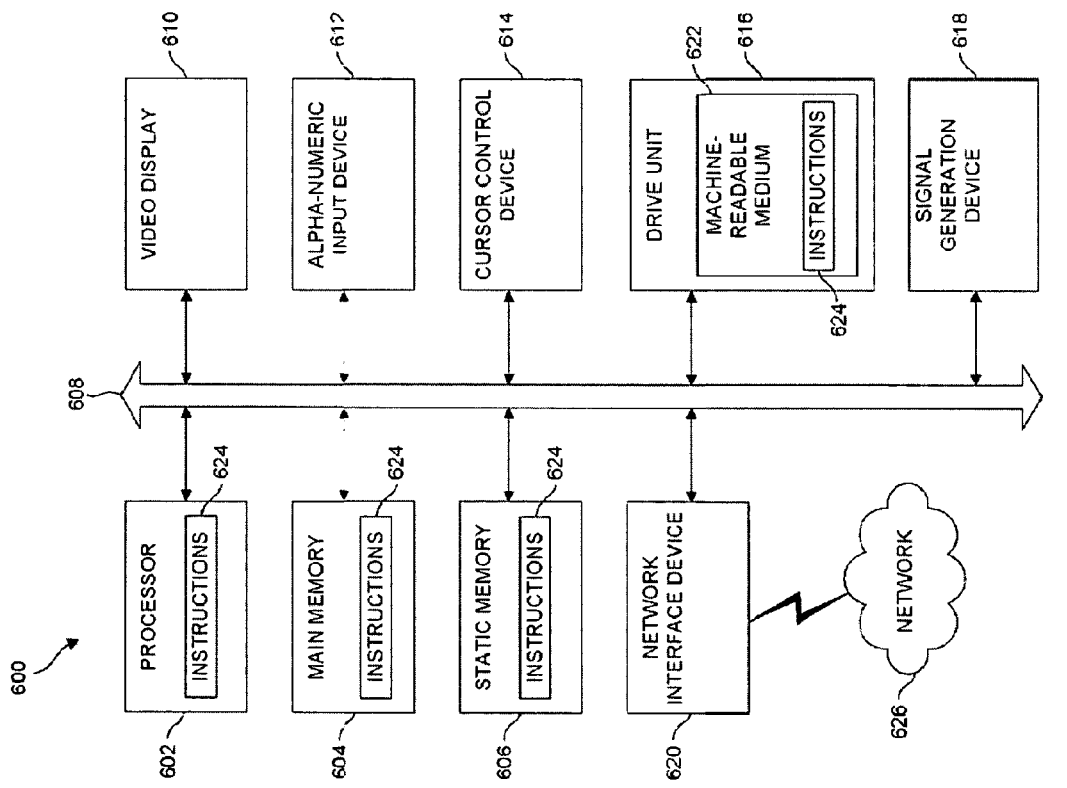
FIG. 6 is a diagrammatic representation of a data processing system capable of processing a set of instructions to perform any one or more of the methodologies herein, according to one embodiment.

FIG. 6 shows a diagrammatic representation of machine in the example form of a computer system 600 within which a set of instructions, for causing the machine to perform any one or more of the methodologies discussed herein, may be executed. In various embodiments, the machine operates as a standalone device and/or may be connected (e.g., networked) to other machines. In a networked deployment, the machine may operate in the capacity of a server and/or a client machine in server-client network environment, and/or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch and/or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 600 includes a processor 602 (e.g., a central processing unit (CPU) a graphics processing unit (GPU) and/or both), a main memory 604 and a static memory 606, which communicate with each other via a bus 608. The computer system 600 may further include a video display unit 610 (e.g., a liquid crystal display (LCD) and/or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions (e.g., software 624) embodying any one or more of the methodologies and/or functions described herein. The software 624 may also reside, completely and/or at least partially, within the main memory 604 and/or within the processor 602 during execution thereof by the computer system 600, the main memory 604 and the processor 602 also constituting machine-readable media.

The software 624 may further be transmitted and/or received over a network 626 via the network interface device 620. While the machine-readable medium 622 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

FIG. 7 is an interaction diagram of a process flow between the merchant device 104, the server device 100 and the client device 106 of FIG. 1, according to one embodiment. In operation 700, the merchant device may classify a section of the inventory on a merchant site for special offering. In operation 702, the server device may crawl the merchant site and identify the section with special offering. In operation 704, the server device may compare a special offerings data with an inventory data to evaluate effectiveness of a deal associated to the special offerings data for a particular item. In operation 706, the merchant device may permit indexing of the section carrying the special offerings.

In operation 708, the server device may process the special offering data to create a deal index. In operation 710, the client device may communicate a item query for a particular item. In operation 712, the server device may analyze the item query using the deal index to identify deals associated to the particular item. In operation 714, the server device may rank the identified deals and generate a clustered representation of the deals. In operation 716, the client device may make an informed selection using the ranking. In operation 718, a transaction data based may be generated by the server device based on the selection. In operation 720, the merchant device may process the transaction data and process consideration of the client device.

Figure 8:
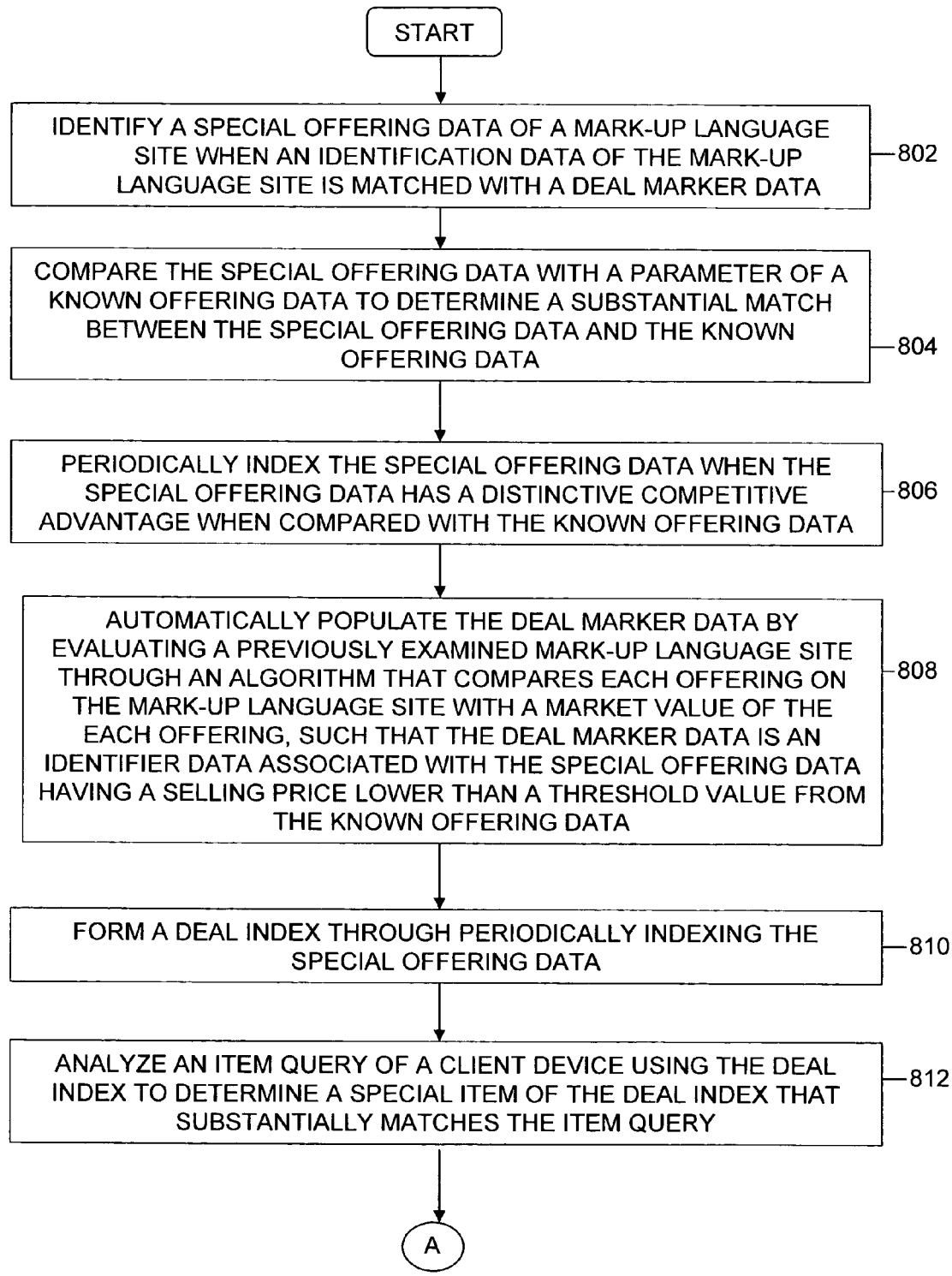
FIG. 8 is a flow chart illustrating a method of the server device of FIG. 1 to identify and evaluate effectiveness of a special offering data, according to one embodiment.

FIG. 8 is a flow chart illustrating a method of the server device 100 (e.g., the server device 100 of FIG. 1) to identify and evaluate effectiveness of a special offering data 108 (e.g., the special offering data 108 of FIG. 1), according to one embodiment. In operation 802, a special offering data (e.g., the special offering data 108 of FIG. 1) of a mark-up language site (e.g., the mark-up language site of the merchant device 104) may be identified when an identification data of the mark-up language site is matched with a deal marker data (e.g., keywords, deal identification data, etc.). In operation 804, the special offering data may be compared with a parameter (e.g., the parameters 516 of FIG. 5) of a known offering data (e.g., associated to the inventory database 210) to determine a substantial match between the special offering data 108 and the known offering data. In operation 806, the special offering data 108 may be periodically indexed when the special offering data 108 has a distinctive competitive advantage (e.g., in terms of item price, item availability, item quality etc.) when compared with the known offering data. In operation 808, the deal marker data may be automatically populated (e.g., as described in FIG. 2) by evaluating a previously examined mark-up language site (e.g., a mark-up language file that was previously examined by the fetcher module 214 and did not return any matches for the deal marker data) through an algorithm that compares each offering (e.g., data associated to each item) on the mark-up language site with a market value (e.g., market price) of the each offering (e.g., by referencing the inventory database 210), such that the deal marker data is an identifier data (e.g., the identification data) associated with the special offering data 108 having a selling price lower than a threshold value from the known offering data (e.g., known inventory data). In operation 810, the deal index 208 may be formed through periodically indexing the special offering data 108 (e.g., the special offering data 108 of FIG. 1). In operation 812, an item query of the client device 106 (e.g., the client device 106 of FIG. 1) may be analyzed using the deal index 208 (as described in the query analysis module 204 of FIG. 2) to determine a special item (e.g., the special item 412 of FIG. 4) of the deal index 208 that substantially matches the item query.

Figure 9:
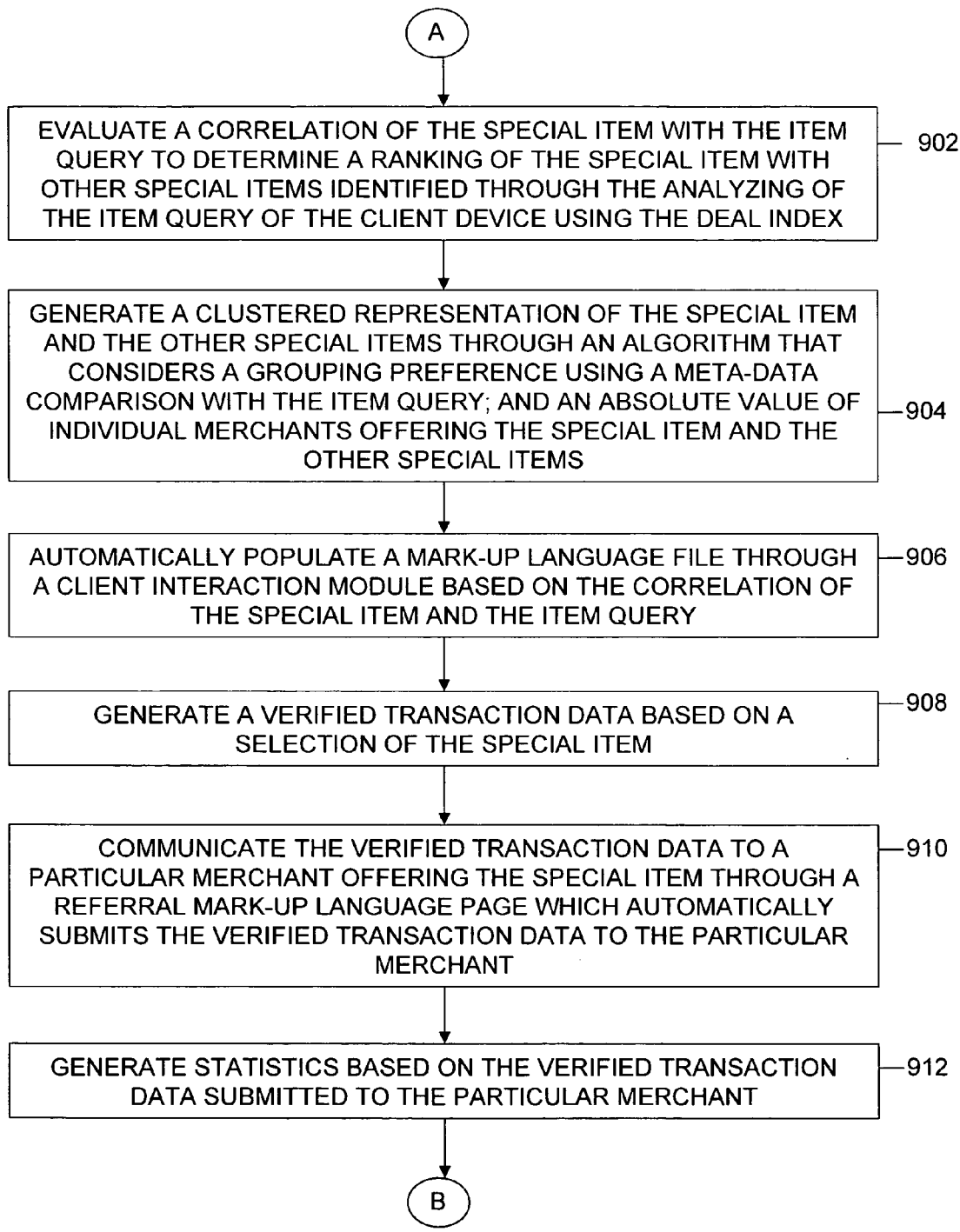
FIG. 9 is a process diagram that describes further the operations in FIG. 8, according to one embodiment.

FIG. 9 is a process diagram that describes further the operations in FIG. 8, according to one embodiment. FIG. 9 begins with a 'circle A' that connotes a continuation from operation 812 of FIG. 8 (e.g., FIG. 8 concludes with the 'circle A'). First in operation 902, a correlation of the special item with the item query may be evaluated to determine a ranking of the special item (e.g., the special item 412 of FIG. 4) with other special items (e.g., as described in the query analysis module 204 of FIG. 2) identified through the analyzing of the item query of the client device 106 using the deal index 208. In operation 904, a clustered representation (e.g., shown as a choice in FIG. 4) of the special item and the other special items may be generated through an algorithm (e.g., algorithms 242 of FIG. 2) that considers a grouping preference using a meta-data comparison with the item query and an absolute value of individual merchants (e.g., a count of merchants) offering the special item and the other special items.

In operation 906, a mark-up language file 240 (e.g., the mark-up language file 240 of FIG. 2) may be automatically populated through a client interaction module 232 (e.g., the client interaction module 232 of FIG. 2) based on the correlation of the special item and the item query. In operation 908, a verified transaction data may be generated (e.g., using the transaction module 206 of FIG. 2) based on a selection of the special item. In operation 910, the verified transaction data may be communicated to a particular merchant offering the special item (e.g., the special item 412 of FIG. 4) through a referral mark-up language page (e.g., referral web-page) which automatically submits the verified transaction data to the particular merchant. In operation 912, statistics (e.g., referral statistics) may be generated (e.g., by using the referral module 246 of FIG. 2) based on the verified transaction data submitted to the particular merchant.

Figure 10:
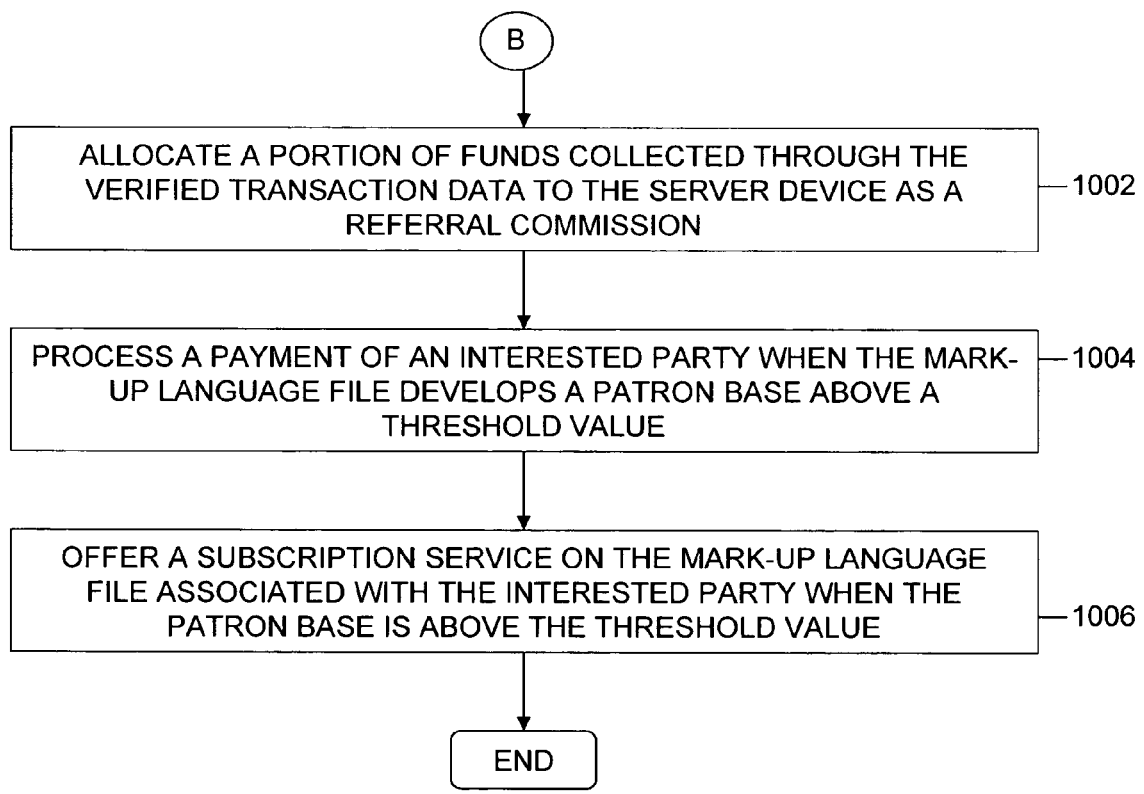
FIG. 10 is a process diagram that describes further the operations in FIG. 9, according to one embodiment.

FIG. 10 is a process diagram that describes further the operations in FIG. 9, according to one embodiment. FIG. 10 begins with a 'circle B' that connotes a continuation from operation 912 of FIG. 9 (e.g., FIG. 9 concludes with the 'circle B'). First in operation 1002, a portion of funds collected through the verified transaction data may be allocated to the server device 100 (e.g., the server device 100 of FIG. 1) as a referral commission. In operation 1004, a payment of an interested party (e.g., a merchant) may be processed when the mark-up language file (e.g., the mark-up language file 240 of FIG. 2) develops a patron base (e.g., a user base) above a threshold value (e.g., a set minimum) and a subscription service 308 (e.g., the subscription service 308 of FIG. 4) may be offered on the mark-up language file 240 associated with the interested party when the patron base is above the threshold value.

Figure 11:
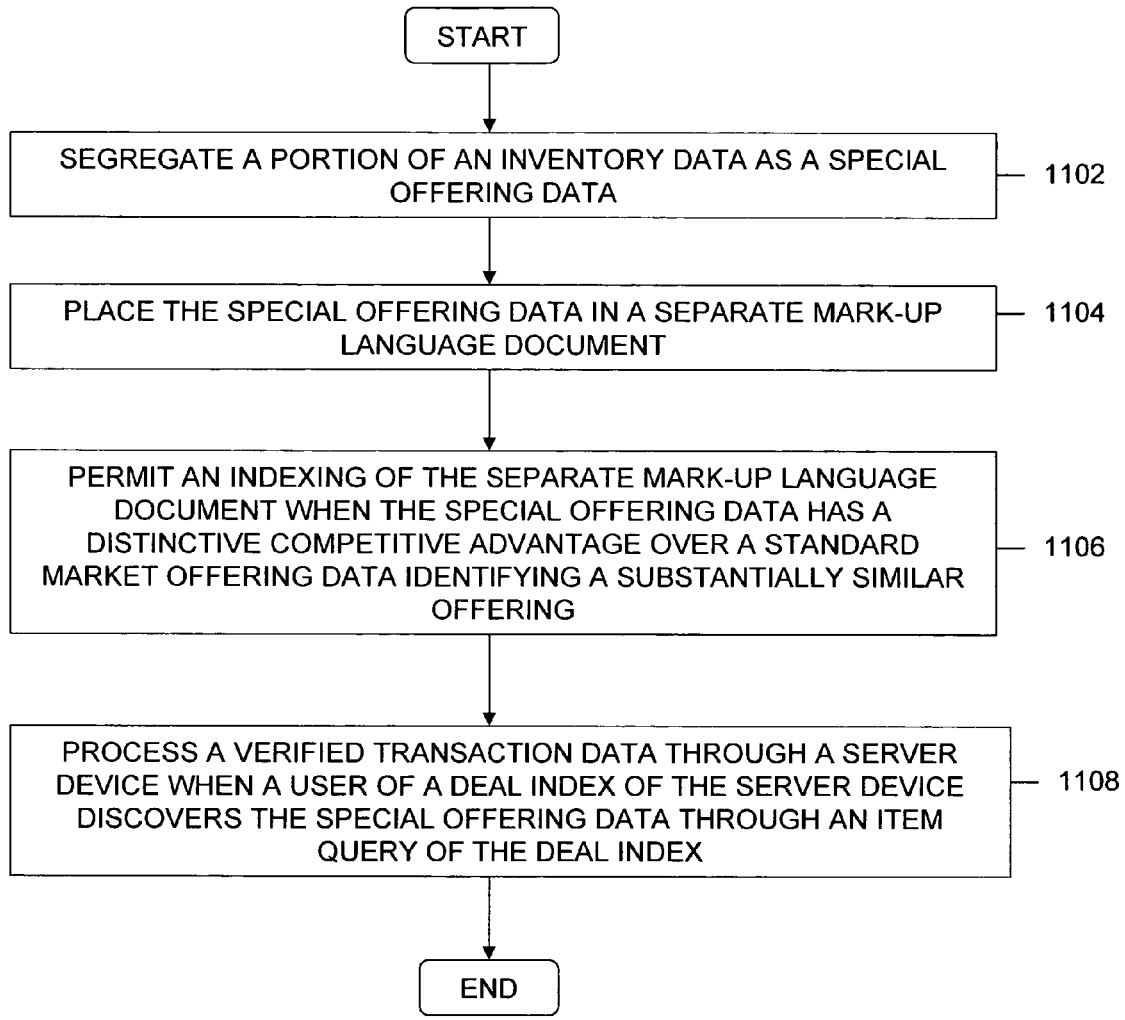
FIG. 11 is a flow chart illustrating a method of the merchant device of FIG. 1 to segregate and permit indexing of the special offering data, according to one embodiment.

FIG. 11 is a flow chart illustrating a method of the merchant device 104 (e.g., the merchant device 104 of FIG. 1) to segregate and permit indexing of the special offering data 108 (e.g., the special offering data 108 of FIG. 1). In operation 1102, a portion of an inventory data (e.g., the inventory data of the merchant device 104) may be segregated as a special offering data 108. In operation 1104, the special offering data 108 may be placed in a separate mark-up language document. In operation 1106, an indexing of the separate mark-up language document may be permitted when the special offering data 108 has a distinctive competitive advantage (e.g., in terms of item price, item availability, item quality etc.) over a standard market offering data (e.g., a standard market item) identifying a substantial similar offering. In operation 1108, a verified transaction data (e.g., verified by the server device 100) may be processed through a server device 100 (e.g., the server device 100 of FIG. 1) when a user of a deal index 208 of the server device 100 discovers the special offering data 108 through an item query of the deal index 208.

Figure 12:
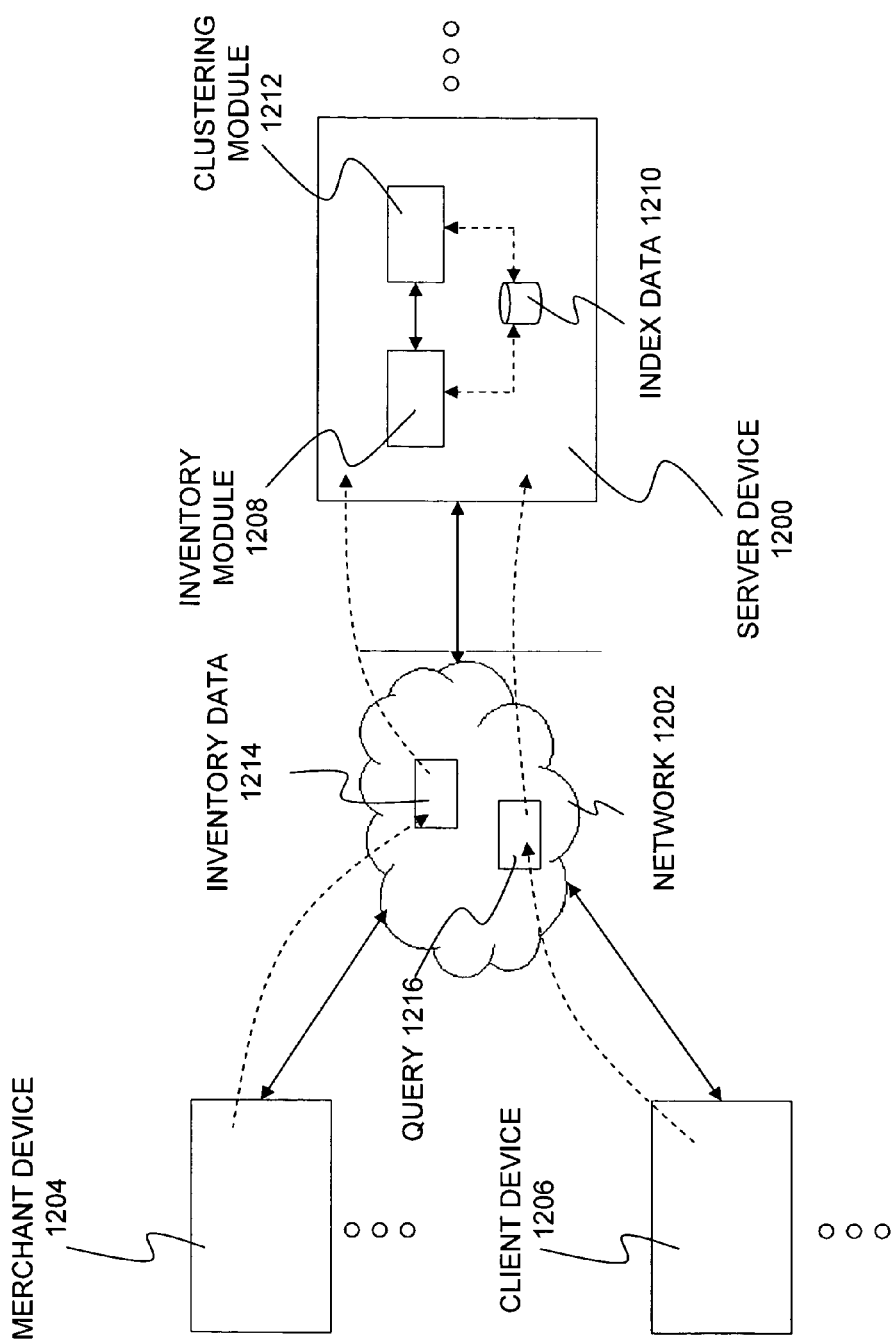
FIG. 12 is a network view of a server device communicating with a merchant device and a client device through a network, according to one embodiment.

FIG. 12 is a network diagram of a server device 1200, a merchant device 1204, and a client device 1206 communicating an inventory data 1214 and a query 1216 through a network 1202 (e.g., an internet network, a wide area network, a local area network, etc.), according to one embodiment. In one embodiment, the merchant device 1204 (e.g., a store selling merchandise over the internet, an individual offering merchandise online, etc.) uni-directionally (e.g., in a one-way direction) communicates the inventory data 1214 (e.g., data pertaining to inventory, stock and/or supply of items that a merchant may offer for sale) to the server device 1200 to improve a search result (e.g., enhance the outcome of a search query posted by a prospective buyer) of at least some item data embedded in the inventory data 1214.

The server device 1200 may include an inventory module 1208 and/or a clustering module 1212 according to one embodiment. In one embodiment, the inventory module 1208 creates an index data 1210 (e.g., an organized collection of item information communicated by the merchant device 1204) using a set of meta-data attributes 1512 (e.g., the set of meta-data attributes 1512 of FIG. 19) associated with an inventory data 1214. The inventory module 1208 may be best understood with reference to FIG. 13, as will later be described. The clustering module 1212 generates at least one grouping through a cluster algorithm (e.g., as illustrated in FIG. 14) that logically organizes data resultant from a query response 1900 (e.g., the query response 1900 of FIG. 19) of a user (e.g., a prospective buyer, an internet surfer, etc.). The clustering module 1212 may be best understood with reference to FIG. 14. The client device 1206 renders a representation of the grouping and communicates a query 1216 (e.g., a search request) to the server device 1200, according to one embodiment. Additional details of FIG. 12 are best understood with reference to FIG. 13 and FIG. 14.

Figure 13:
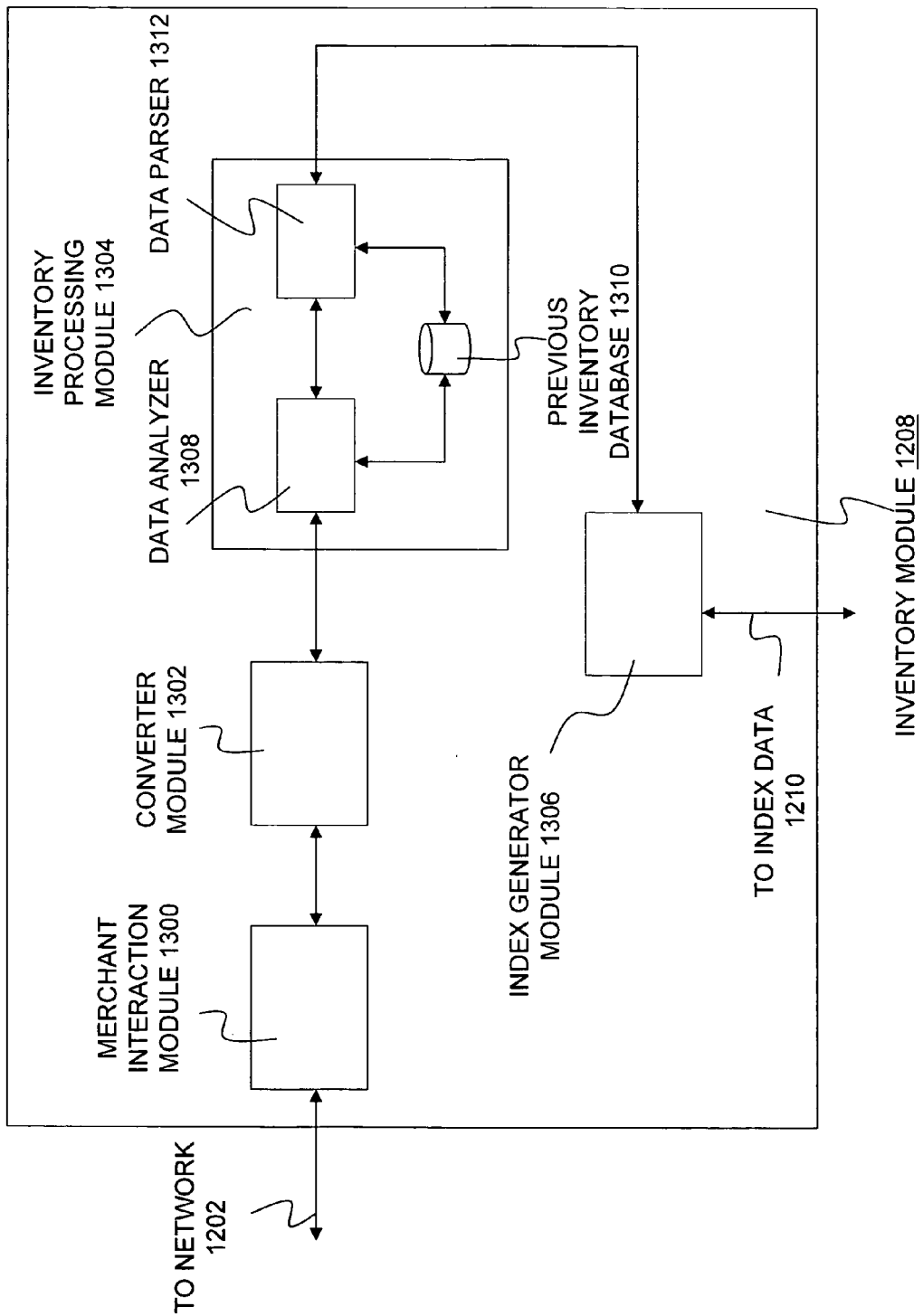
FIG. 13 is an exploded view of an inventory module of FIG. 12, having merchant interaction module, a converter module, a cooker module, and an index generator module, according to one embodiment.
Figure 14:
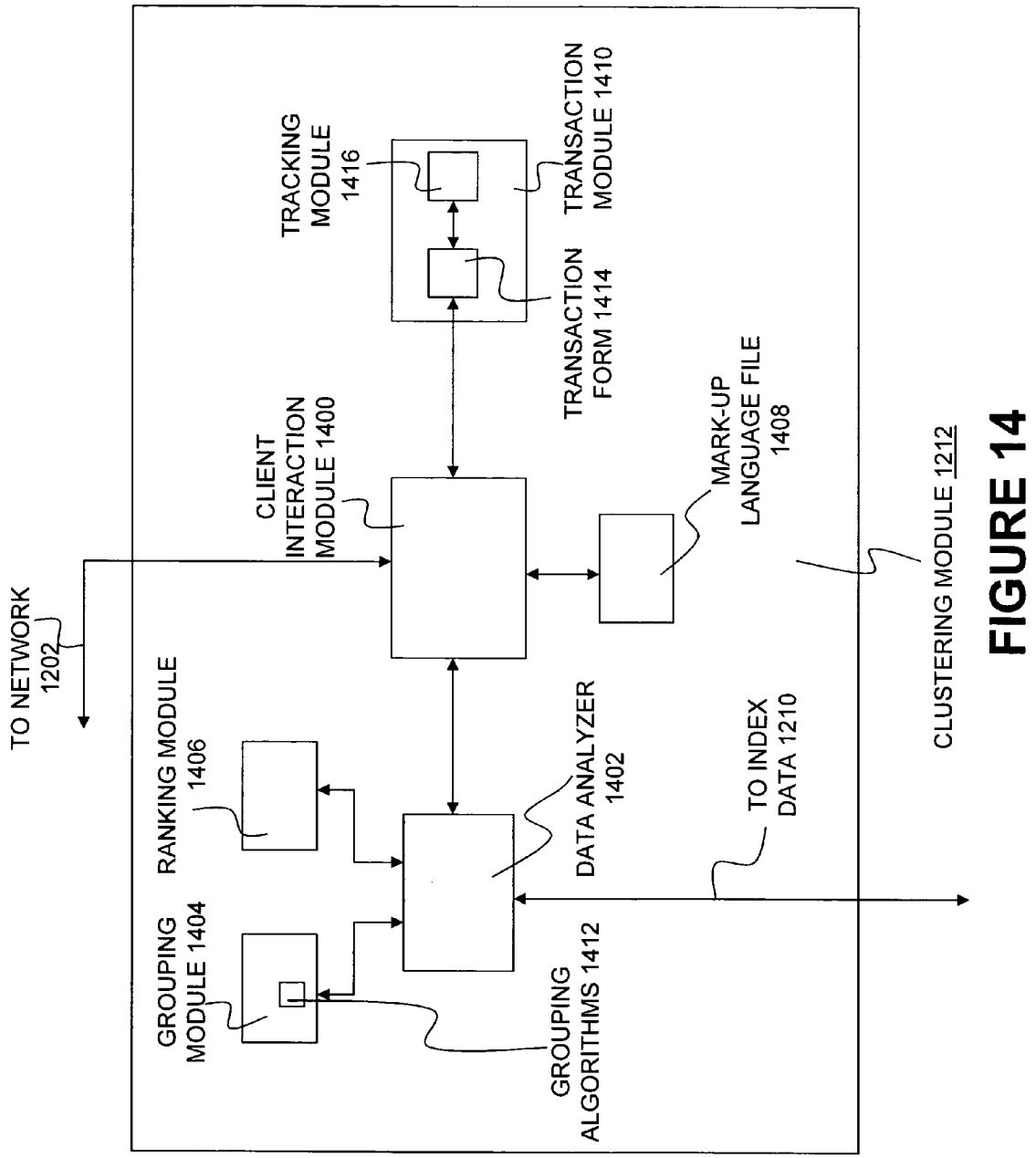
FIG. 14 is an exploded view of a clustering module of FIG. 12 having a grouping module, a ranking module and a transaction module, according to one embodiment.

FIG. 13 is an exploded view of the inventory module 1208 of FIG. 12 having a merchant interaction module 1300, a converter module 1302, an inventory processing module 1304 and/or an index generator module 1306 according to one embodiment. The merchant interaction module 1300 may serve as a platform to facilitate interaction between the merchant device 1204 and the server device 1200. In one embodiment, the merchant device 1204 may uni-directionally communicate the inventory data 1214 to the server device 1200 through the merchant interaction module 1300 (e.g., by using an inventory upload feature). An incentive data tailored to a merchant (e.g., a store selling merchandise over the internet, an individual offering merchandise online, etc.) associated with a merchant-uploaded inventory data (e.g., the inventory data 1214 of FIG. 12) may be generated to encourage the merchant to periodically communicate revised versions of an inventory (e.g., list of items held by a merchant) of the merchant to the server device 1200 (e.g., the server device 1200 of FIG. 12), according to one embodiment. The incentive data may be a financial incentive data (e.g., a cost benefit), a marketing incentive data (e.g., special promotional benefit), and/or an operational incentive data (e.g., benefits in day to day operations). Other feature(s) of the merchant interaction module 1300 are best understood with reference to FIG. 18, as will later be described.

The converter module 1302 may convert the merchant-uploaded inventory data (e.g., the inventory data 1214 communicated by the merchant device 1204 through the merchant interaction module 1300) to a structured format (e.g., an organized format and/or a process conducive format) prior to processing of the merchant-uploaded inventory data having the set of meta-data attributes (e.g., the set of meta-data attributes 1512 of FIG. 15), according to one embodiment. The inventory processing module 1304 may include a data analyzer 1308, a previous inventory database 1310 and/or a data parser 1312, according to one embodiment. In one embodiment the server device 1200 processes (e.g., by using a processor 602 of FIG. 6) a merchant-uploaded inventory data (e.g., the inventory data 1214 of FIG. 12) to determine a set of meta-data attributes 1512 (e.g., the set of meta-data attributes 1512 of FIG. 15) associated with the merchant-uploaded inventory data.

Particularly the set of meta-data attributes 1512 may be determined by the data analyzer 1308 by referencing the previous inventory database 1310 and carrying out a comparative analysis of the inventory data 1214 (e.g., comparison of attributes associated to an inventory data uploaded by a merchant to attributes associated to a previous inventory data of the same merchant) to identify at least a portion of the set of meta-data attributes 1512 which do not need to be updated (e.g., meta-data attributes that are common and/or similar in both the inventory data 1214 and the previous inventory data of the previous inventory database 1310). The set of meta-data attributes 1512 determined by the data analyzer 1308 may then be parsed (e.g., extracted) from the inventory data 1214 using the data parser 1312.

The index generator module 1306 may generate an index data 1210 based on a feed (e.g., processed data) supplied by the inventory processing module 1304 (e.g., as such the index data 1210 may be a "self service" index, in that it may be self-refreshed using data uploaded by merchants whenever they want the index to be refreshed). In one embodiment the server device 1200 (e.g., the server device 1200 of FIG. 12) creates an index data 1210 using the set of meta-data attributes 1512 (e.g., the set of meta-data attributes 1512 determined by the data analyzer 1308) associated with the merchant-uploaded inventory data (e.g., the inventory data 1214 of FIG. 12). Particularly the index generator module 1306 may create the index data 1210 by using an incremental algorithm to infuse (e.g., introduce) the set of meta-data attributes 1512 (e.g., the set of meta-data attributes determined by the inventory processing module 1304) into a pre-existing index (e.g., an index having substantially similar data as the index data 1210).

FIG. 14 is an exploded view of the clustering module 1212 of FIG. 12 having a client interaction module 1400, a data analyzer 1402, a grouping module 1404, a ranking module 1406, a mark-up language file 1408 and/or a transaction module 1410, according to one embodiment. The client interaction module 1400 servers as in interface between the client device 1206 (e.g., the client device 1206 of FIG. 12) and the merchant device 1204 (e.g., the merchant device 1204 of FIG. 12). First a query 1216 (e.g., a search request) is posted by a user (e.g., a prospective buyer) to the server device 1200 through the client interaction module 1400.

In one embodiment, the query 1216 of the client device 1206 is analyzed using an index data 1210 to determine a set of meta-data attributes 1512 of the index data 1210 that match the query 1216. Particularly the query 1216 is received by the data analyzer 1402 and analyzed and/or processes (e.g., by using the processor 602 of FIG. 6) by comparing the query 1216 to the index data 1210 (e.g., comparison of specific keywords in a query to the content associated to the index data 1210) to identify and/or determine the set of meta-data attributes 1512 (e.g., extract and/or determine product identifier, product description, product brand, etc. associated to item(s) from the index data 1210) that match (e.g., correspond) to the query 1216. The data analyzer 1402 may then pool (e.g., generate a collection) the set of meta-data attributes 1512 (e.g., the set of meta-data attributes that matched the query 1216) to create a query response 1900 (e.g., the query response 1900 of FIG. 19).

The grouping module 1404 may include a grouping algorithm(s) 1412 required to process the query response 1900. The data analyzer 1402 may reference the grouping algorithm(s) 1412 present in the grouping module 1404 to selectively group the set of meta-data attributes 1512 of the query response 1900 to create a set of data clusters 1902 (e.g., the set of data clusters 1902 of FIG. 19), according to one embodiment. Specifically the grouping of the set of meta-data attributes 1512 of the query response 1900 is based on application of one or more grouping algorithms (e.g., applied simultaneously and/or sequentially) to logically associate certain items with other items (e.g., relating different items by grouping based on item identifier, item description and/or item brand associated to the item(s)) through a neural network algorithm that examines and generates a meta-data associated with each of the certain items simultaneously to the generation of data clusters 2012 (e.g., the data clusters 2012 of FIG. 20).

Figure 19:
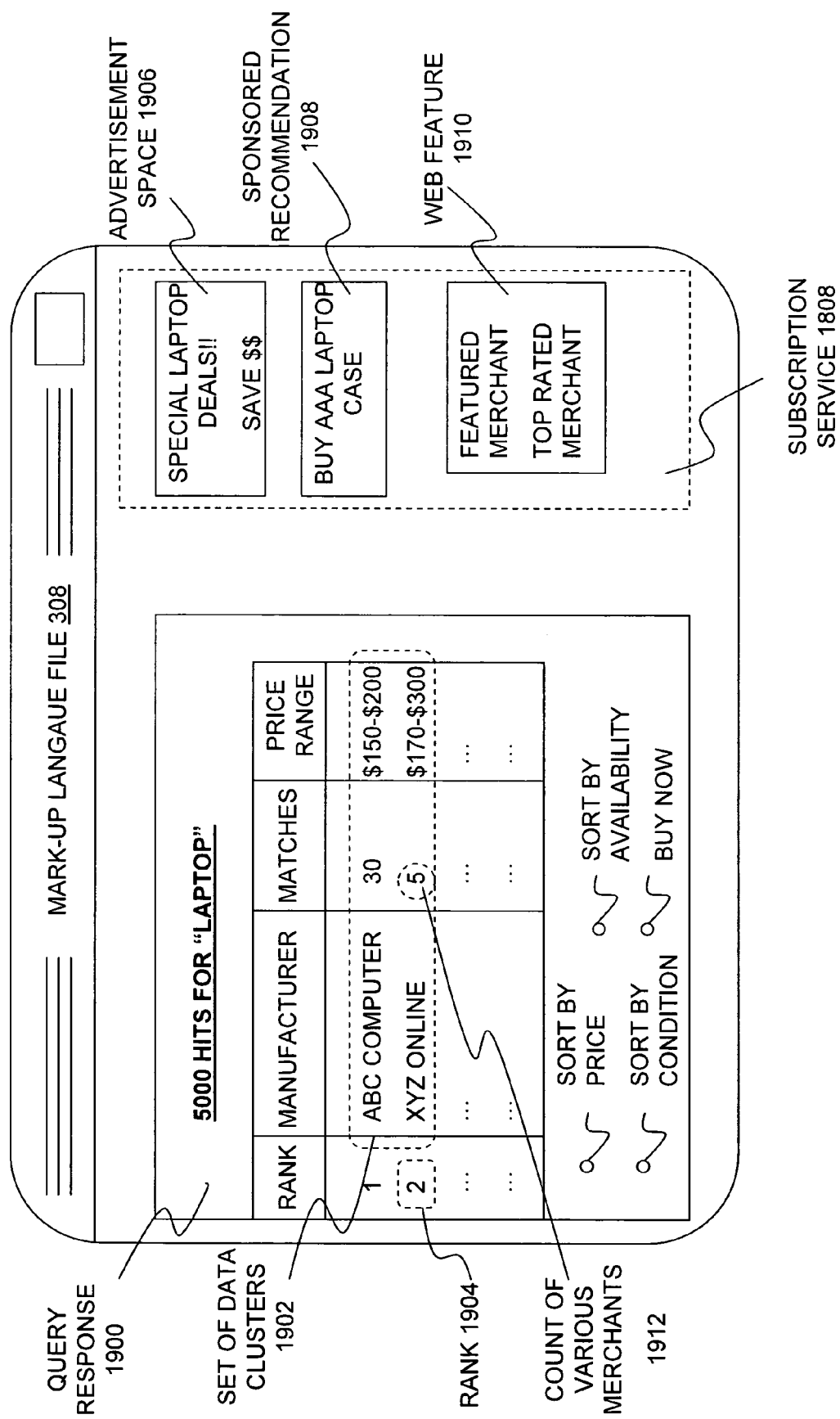
FIG. 19 is a user interface view of the mark-up language file of FIG. 14, according to one embodiment.

The ranking module 1406 may generate a rank 1904 (e.g., the rank 1904 of FIG. 19) of the set of data clusters 1902 (e.g., the set of data clusters 1902 of FIG. 19) based on a count of various merchants 1912 (e.g., the count of various merchants 1912 of FIG. 19) offering a particular item associated to the set of data clusters 1902. Particularly the data analyzer 1402 may reference the ranking module 1406 and communicate through the client interaction module 1400 a visual data structuring have a set of rows and a set of columns (e.g., as illustrated in FIG. 19) that logically group items of different ones of the set of data clusters 1902 based on the count of various merchants 1912 having the items in the different ones of the set of data clusters 1902 (e.g., based on item popularity gauged by the number of unique merchants offering and/or holding the particular item associated to the set of data clusters 1902). The mark-up language file 1408 (e.g., a web page) may be automatically populated with the set of data clusters 1902 generated by the data analyzer 1402 through the client interaction module 1400.

The transaction module 1410 may generate a transaction data (e.g., item information, shipping information, price information etc associated to a particular item) based on a user selection of the particular item (e.g., after studying the visual data on the mark-up language file 1408) associated to the set of data clusters 1902 and communicate the transaction data to a elected merchant (e.g., based on user selection of the item) offering the particular item, according to one embodiment. The transaction module may include a transaction form 1414 and/or a tracking module 1416, according to one embodiment. The transaction form 1414 may be used to facilitate transaction(s) (e.g., by permitting a user to enter transaction data in the transaction form 1414) between a user (e.g., a buyer) and the merchant device 1204 (e.g., the merchant device 1204 of FIG. 12) through the server device 1200 (e.g., the server device 1200 of FIG. 12).

In one embodiment, the tracking module 1416 may embed (e.g., insert) a tracking data (e.g., data to keep count and/or trail of user transaction with a merchant through the server device 1200) through a redirection of the transaction data to a mark-up language document (e.g., the transaction form 1414) external to the merchant device 1204 and generate a statistical data of referral rates 1806 (e.g., the statistical data of referral rates 1806 of FIG. 18) to the elected merchant (e.g., the merchant chosen based on user selection of an item) through the tracking data. The transaction module 1410 may process a payment of an interested party (e.g., a merchant, a service vendor, etc.) when the mark-up language file 1408 develops a patron base (e.g., a user base) above a threshold value (e.g., a set minimum) and may offer a subscription service 1808 (e.g., the subscription service 1808 of FIG. 18) on the mark-up language file 1408 associated with the interested party when the patron base is above the threshold value, according to one embodiment.

FIG. 15 is a table view of content of index data 1210 of FIG. 12, according to one embodiment. The table 1500 in FIG. 15 may include an item description field 1502, an item identifier field 1504, a merchant identifier field 1506, an item brand field 1508 and/or an other field 1510. A set of meta-data attributes 1512 associated with the inventory data 1214 (e.g., the inventory data 1214 of FIG. 12) may be an item identifier (e.g., a SKU number, a UPC number, a model number, a part number etc.), an item description (e.g., item name, specification, etc.), a merchant identifier (e.g., an identity tag associated to a merchant) and/or an item brand (e.g., item make, manufacturer, etc.).

The item description field 1502 may be a name and/or a description tag associated with an item. The item identifier field 1504 may be reference identifier (e.g., information to identify and/or distinguish an item) associated with the item. The merchant identifier field 1506 may be a reference tag associated to a particular merchant to keep a track of items offered by the particular merchant. The item brand field 1508 may be a brand name and/or a brand description tag associated with an item. The other field 1510 may indicate miscellaneous and/or additional information with and/or relevant to the item.

For example, two items are illustrated in FIG. 15 (e.g., 'Laptop' and 'Biography of John Doe'). The item 'Laptop' has a UPC value '2324', EAN value '2112', SKU value '54', part number value '2000UN', model number '11900' in the item identifier field 1504 indicating reference identifier(s) (e.g., a universal product code, a european article number, a store keeping unit, item part number, item model number etc.) associated with 'Laptop'. The merchant identifier field 1506 has a value '1' indicating the merchant reference number associated with the item 'Laptop'. The item brand field 1508 has a value 'ABC Electronic' indicating the brand name associated with the item 'Laptop'. In addition item 'Laptop' includes 'X, Y' in the other field 1510, indicating any supplemental information that may be relevant to the item 'Laptop'.

Item 'Biography of John Doe' has an ISBN value '32423' in the item identifier field 1504 indicating the reference identifier (e.g., international standard book number) associated with 'Biography of John Doe'. The merchant identifier field 1506 has a value '2' indicating the merchant reference number associated with the item 'Biography of John Doe'. The item brand field 1508 has a value 'XYZ Books' indicating the publisher name associated with the item 'Biography of John Doe'. In addition item 'Biography of John Doe' includes 'Z, Y' in the other field 1510, indicating any supplemental information that may be relevant to the item 'Biography of John Doe'.

FIG. 16 is an interaction diagram of a process flow between the merchant device 1204, the server device 1200 and the client device 1206 of FIG. 12, according to one embodiment. In operation 1600, inventory data may be communicated by the merchant device to the server device. In operation 1602, the inventory data may be converted to a structured format by the server device. In operation 1604, the inventory data may be processed by the server device to create an index. In operation 1606, a user query may be communicated by the client device to the server device. In operation 1608, the user query may be analyzed by the server device using the index to create a query response. In operation 1610, the query response may be selectively grouped by the server device to create data clusters. In operation 1612, the data clusters may be organized by the server device according to popularity of an item (e.g., based on a count of various merchants offering the item). In operation 1614, an informed selection may be made by the client device using the data clusters. In operation 1616 a transaction data may be generated by the server device based on the selection. In operation 1618, the transaction data and the consideration of the client device may be processed by the merchant device.

Figure 17:
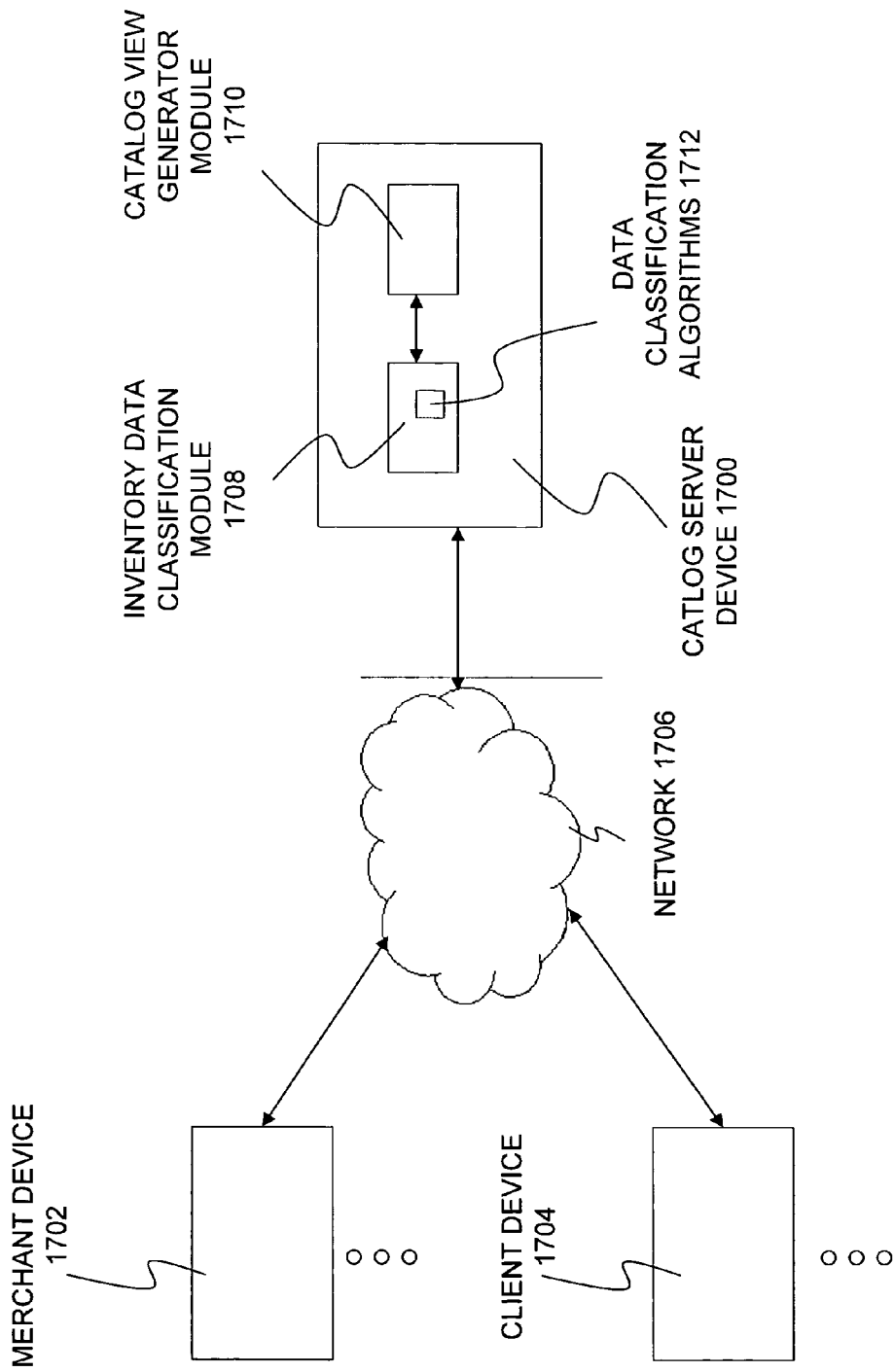
FIG. 17 is a block diagram of a catalog server communicating between a number of merchant devices and a number of client devices, according to one embodiment.

FIG. 17 is a block diagram of a catalog server device 1700 communicating between a number of merchant devices (e.g., a merchant device 1702) and a number of client devices (e.g., a client device 1704) through a network 1706, according to one embodiment. The catalog server device 1700 may process the inventory data 1214 (e.g., the inventory data 1214 of FIG. 12 to generate a structured catalog view 2400 (e.g., the structured catalog view 2400 of FIG. 24 having a set of data classifiers 2402 (e.g., the set of data classifiers 2402 of FIG. 24). The merchant device 1702 may periodically (e.g., daily, weekly, etc.) communicate the inventory data 1214 (e.g., store inventory) to the catalog server device 1700. The client device 1704 may access the structured catalog view 2400 generated by the catalog server device 1700 and may carry out a transaction (e.g., a purchase) based on a selection from the structured catalog view 2400.

The catalog server device 1700 may have an inventory data classification module 1708 and/or a catalog view generator module 1710, according to one embodiment. The inventory data classification module 1708 may include a data classification algorithms 1712. The inventory data classification module 1708 may generate the set of data classifiers 2402 by using the data classification algorithms 1712. The catalog view generator module 1710 may generate and/or render a structured view (e.g., the structured catalog view 2400 of FIG. 24) of the set of data classifiers 2402. In one embodiment the catalog server device 1700 determines a set of meta-data attributes (e.g., the set of meta-data attributes 1512 of FIG. 15) associated with the merchant-uploaded inventory data (e.g., the inventory data 1214 of FIG. 12) to classify (e.g., categorize) the merchant-uploaded inventory data based on a set of data classifiers (e.g., electronics categories, book categories, clothing categories, etc.) and to render the structured catalog view 2400 of the set of data classifiers 2402 having the merchant-uploaded inventory data and other price search data (e.g., prices associated to various offerings) aggregated (e.g., collected) across a plurality of merchants.

Particularly the inventory data classification module 1708 may reference the data classification algorithms 1712 to determine and/or identify (e.g., extract) the meta-data attributes associated to the inventory data 1214 (e.g., item description, item identifier, item brand, etc.) and classify the inventory data 1214 into different classes and/or categories. The inventory data classification module 1708 may then associate the price search data (e.g., the price search data 2408 of FIG. 24 aggregated from a number of merchant devices) to a particular data classifier (e.g., the particular data classifier 2412 of FIG. 12) and create a database (e.g., a datamart) having various price search data associated with respective data classifiers, according to one embodiment. The catalog view generator module 1710 may then use the database to generate the structured catalog view 2400 having a clustered representation 2404 based on a grouping and ranking mechanism (e.g., as described in the clustering module 1212 of FIG. 14). In one embodiment the catalog server device 1700 generates a clustered representation (e.g., the clustered representation 2404 of FIG. 24) of the price search data (e.g., the price search data 2408 of FIG. 24) through an algorithm (e.g., algorithms similar to the grouping algorithms 1412 of FIG. 14) that considers a grouping preference using a meta-data comparison with the data classifier and an absolute value of individual merchants (e.g., count of unique merchants) offering the price search data 2408 and other price search data. The catalog view generator module 1710 may also render a structured view of special offering data 2406 (e.g., the structured view of the special offering data 2406 of FIG. 24) based on comparison of the special offering data 108 (e.g., the special offering data 108 of FIG. 1) with a parameter of a known offering data (e.g., as illustrated by the deal analysis module 200 of FIG. 2).

Figure 18:
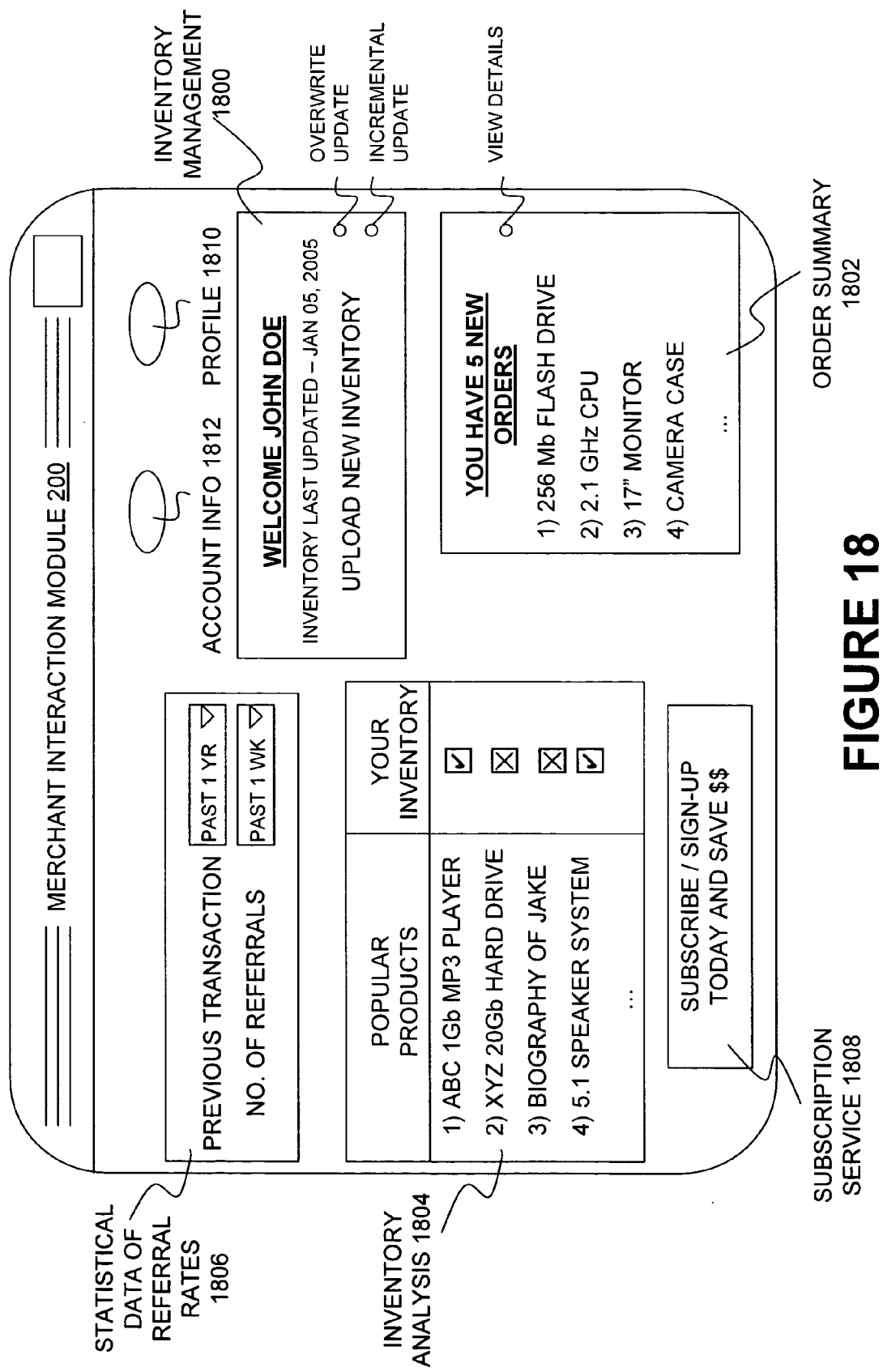
FIG. 18 is a user interface view of the merchant interaction module of FIG. 13, according to one embodiment.

FIG. 18 is a user interface view of the merchant interaction module 1300 of FIG. 13, according to one embodiment. The user interface view may include an inventory management view 1800, an order summary view 1802, an inventory analysis view 1804, a statistical data of referral rates 1806, a subscription service 1808, a profile view 1810 and/or an account information view 1812. The inventory management view 1800 may provide a summary (e.g., a time stamp of last update, number of items uploaded, current inventory size, etc.) related to inventory data 1214 (e.g., the inventory data 1214 of FIG. 12) communicated by the merchant device 1204.

The inventory management view 1800 may also allow the merchant device 1204 to upload inventory to the server device 1200 through an incremental update (e.g., preserving the previous inventory and only updating the changes) and/or an overwrite update (e.g., overwriting the previous inventory). The order summary view 1802 may provide a summary (e.g., a list and/or detailed information) of orders (e.g., items purchased by user(s)) generated from the transaction data based on selection of particular item(s) by the user(s) (e.g., a buyer). The inventory analysis view 1804 may provide an analysis of the inventory data 1214 uploaded by the merchant device 1204. For example, the analysis may provide a list of particular items (e.g., popular items, fast selling items, items in demand, etc.) and compare the list to the inventory data 1214 associated to a particular merchant to check if the particular merchant has the particular items (e.g., the popular item) in its inventory.

The statistical data of referral rates 1806 provides a statistical analysis (e.g., number of user referrals, preference of users, etc.) of users referred to the merchant device 1204 through the server device 1200. The statistical analysis may be generated though a tracking data associated to the transaction data (e.g., as described in FIG. 14). The subscription service 1808 may allow a merchant to sign-up and/or subscribe to a subscription service 1808 (e.g., a paid service) offered by the server device 1200. The subscription service 1808 may be an advertisement space 1906 (e.g., the advertisement space 1906 of FIG. 19), a sponsored recommendation 1908 (e.g., the sponsored recommendation 1908 of FIG. 19) and/or a web feature 1910 (e.g., the web feature 1910 of FIG. 19). The account information view 1812 may display subscription information about the merchant (e.g., balance, account preference, etc.). The profile view 1810 may include data about the merchant (e.g., name, address, email address and/or transaction preference, etc.).

FIG. 19 is a user interface view of the mark-up language file 1408 of FIG. 14, according to one embodiment. The user interface view may include a query response 1900, a set of data clusters 1902, a rank 1904, an advertisement space 1906, a sponsored recommendation 1908, a web feature 1910 and/or a count of various merchants 1912. The query response 1900 provides a summary (e.g., a result summary) of the query response 1900 generated by the clustering module 1212 (e.g., as described in FIG. 14) in response to a query 1216 (e.g., the query 1216 of FIG. 12) posted by a user. The set of data clusters 1902 shows the data clusters (e.g., the data clusters 2012 of FIG. 20) generated from the query response 1900. For example, the first cluster shows a 'laptop' manufactured by 'ABC Computer' with '30' matches (e.g., 30 different merchants offering the item) within a price range of '$150-$200'.

The rank 1904 shows the rank for a particular data cluster. The rank 1904 may be determined based on the count of various merchants 1912 offering an item associated to the set of data clusters (e.g., as described in FIG. 14). For example, the data cluster for 'laptop' manufactured by 'ABC Computer' has a value of '30' as the count of various merchants 1912 as compared to the 'laptop' manufactured by 'XYZ online' which has a value of '5' as the count of various merchants 1912. Hence the data cluster for 'laptop' manufactured by 'ABC Computer' is ranked before the data cluster for 'laptop' manufactured by 'XYZ Online'.

The advertisement space 1906 may be a place for displaying advertisements of an interested party (e.g., a merchant) who may have subscribed for subscription service 1808 (e.g., the subscription service 1808 of FIG. 18). The sponsored recommendation 1908 may be an area on the mark-up language file 1408 (e.g., the mark-up language file 1408 of FIG. 14) for displaying recommendations (e.g., specific recommendations based on user query) of an interested party (e.g., a merchant) who may have signed-up for subscription service 1808. The web feature 1910 may be a section on the mark-up language file 1408 to promote an interested party (e.g., through merchant ratings, special merchant features, etc.) who may have opted for subscription service.

Figure 20:
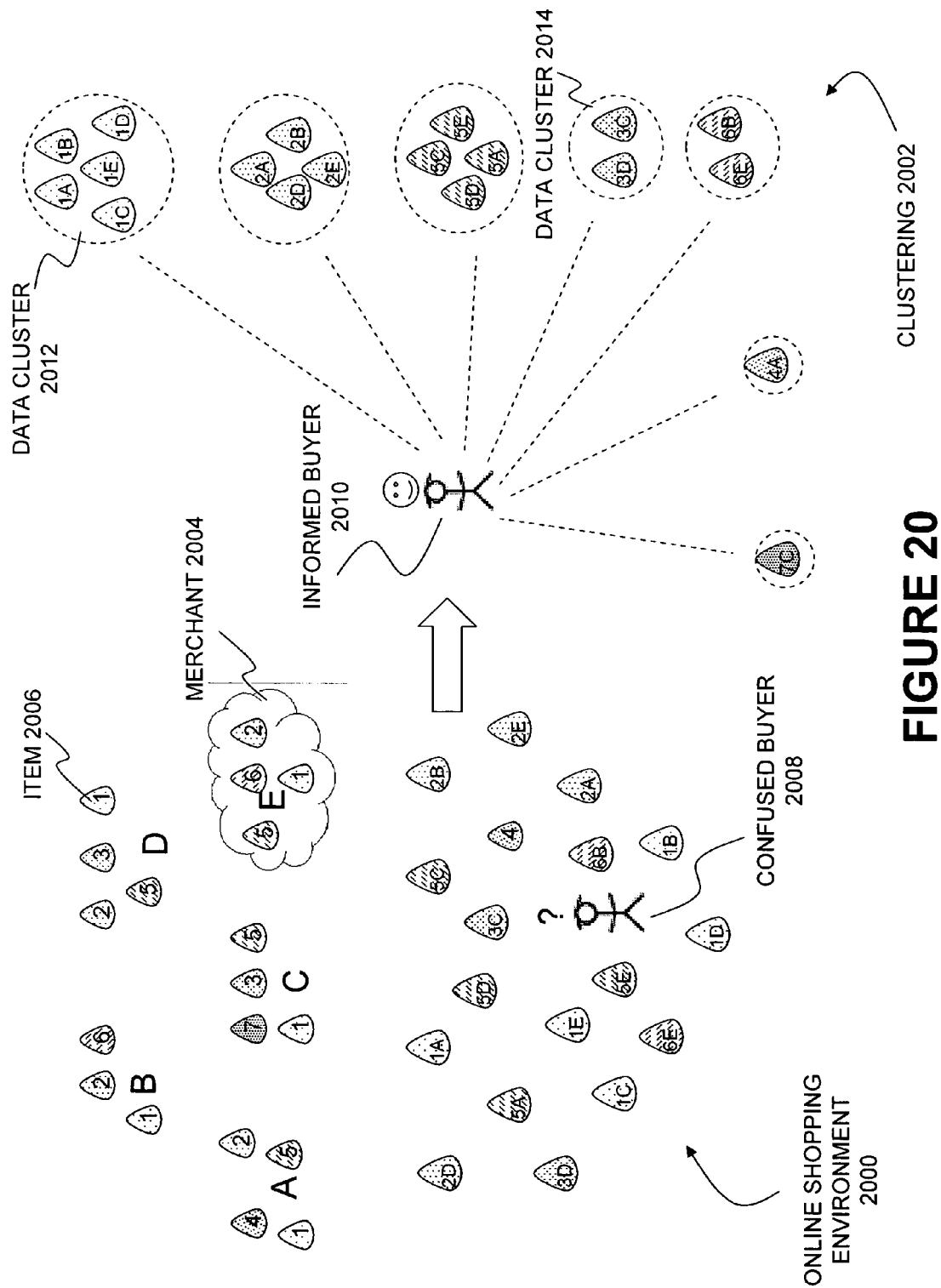
FIG. 20 is a graphical illustration to illustrate the effectiveness of clustering in an online shopping environment.

FIG. 20 is a graphical illustration to illustrate the effectiveness of data clustering in an online shopping environment. The online shopping environment 2000 shows a clouded shopping environment where various merchants, like merchant 2004 (e.g., merchant 'A', 'B', 'C', 'D', 'E', etc.) offer various items (e.g., item '1', '2', '3', '4', etc.). An item 2006 may be offered by various merchants (e.g., item 1A, 1B, 1C etc where item 1A is item 1 offered by merchant A, item 1B is item 1 offered by merchant B and so on). Moreover, item '1', '2', '3', etc. may be variations of a similar item (e.g., a hard drive device with varying capacities) In such an environment it may be difficult for a user (e.g., a prospective buyer) to gauge, analyze and/or process this large amount of data to reach an informed decision. This may be characterized by a confused buyer 2008.

A clustering 2002 may be performed on the large amount of unorganized (e.g., chaotic) data to create data clusters. The data clusters 2012 may be a collection of similar items (e.g., similar specification and/or similar brand like item '1') offered by a variety of merchants (e.g., merchant 'A', 'B', 'C', 'D' 'E' of FIG. 20). The set of data clusters 1902 (e.g., the set of data clusters 1902 of FIG. 19) may be a collection of different data clusters (e.g., like the data clusters 2012). Further, the set of data clusters 1902 may be organized based on a popularity of a particular item (e.g., based on a count of various merchants offering the particular item).

For example, in FIG. 20 item '1' is offered by '5' merchants (e.g., merchant 'A', 'B', 'C', 'D' and 'E' as shown by the data clusters 2012) as compared to item '3' which is offered by '2' merchants (e.g., merchant 'C' and 'D' as shown by data cluster 2014). This would provide for a higher ranking for the data cluster having item '1' (e.g., the data clusters 2012) as compared to the data cluster of item '3' (e.g., the data cluster 2014). Hence clustering 2002, may provide the user with adequate assistance (e.g., by providing an organization and analysis of a large amount of data in the form of data clusters) to help him/her make an informed decision (e.g., as characterized by an informed buyer 2010).

Figure 21:
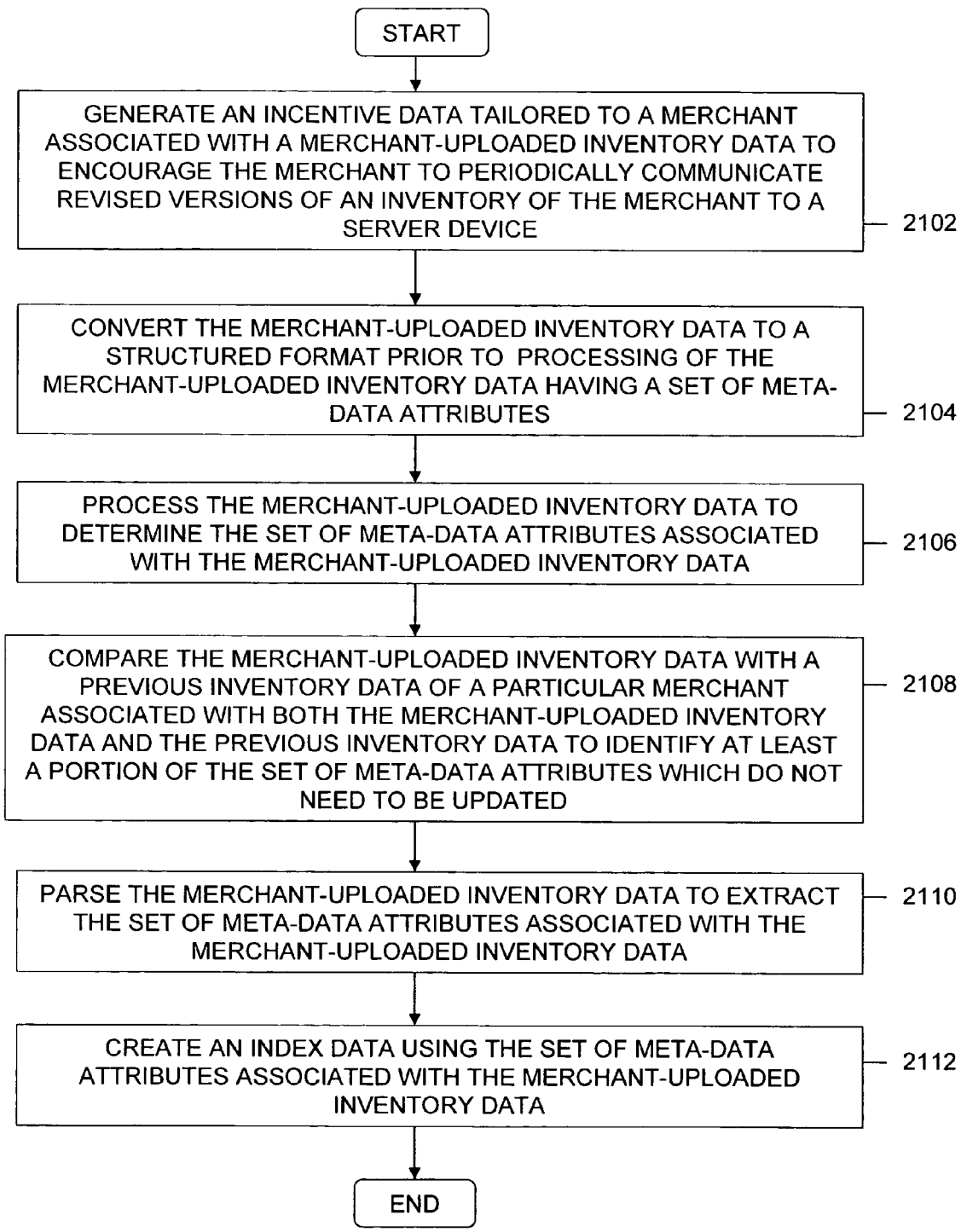
FIG. 21 is a flow chart illustrating a method to process a merchant-uploaded inventory data to create an index data, according to one embodiment.

FIG. 21 is a flow chart illustrating a method to process the merchant-uploaded inventory data (e.g., the inventory data 1214 of FIG. 12) to create the index data 1210 (e.g., the index data 1210 of FIG. 12), according to one embodiment. In operation 2102, an incentive data tailored to a merchant (e.g., a store selling merchandise over the internet, an individual offering merchandise online, etc.) associated with a merchant-uploaded inventory data (e.g., the inventory data 1214 of FIG. 12) may be generated to encourage the merchant to periodically communicate revised versions of an inventory (e.g., list of items held by a merchant) of the merchant to the server device 1200 (e.g., the server device 1200 of FIG. 12). In operation 2104, the merchant-uploaded inventory data may be converted to a structured format (e.g., an organized format and/or a process conducive format) prior to processing of the merchant-uploaded inventory data having a set of meta-data attributes 1512 (e.g., the set of meta-data attributes 1512 of FIG. 15).

In operation 2106, the merchant-uploaded inventory data may be processed to determine the set of meta-data attributes 1512 associated with the merchant-uploaded inventory data (e.g., as described in FIG. 13). In operation 2108, the merchant-uploaded inventory data may be compared with a previous inventory data (e.g., the previous inventory data of the previous inventory database 1310 of FIG. 13) of a particular merchant associated with both the merchant-uploaded inventory data and the previous inventory data to identify at least a portion of the set of meta-data attributes 1512 which do not need to be updated (e.g., as described in the inventory processing module 1304 of FIG. 13). In operation 2110, the merchant-uploaded inventory data (e.g., the inventory data 1214 of FIG. 12) may be parsed to extract the set of meta-data attributes 1512 associated with the merchant-uploaded inventory data. In operation 2112, a index data 1210 (e.g., the index data 1210 of FIG. 12) may be created using the set of meta-data attributes 1512 associated with the merchant-uploaded inventory data (e.g., with the help of the index generator module 1306 of FIG. 13).

Figure 22:
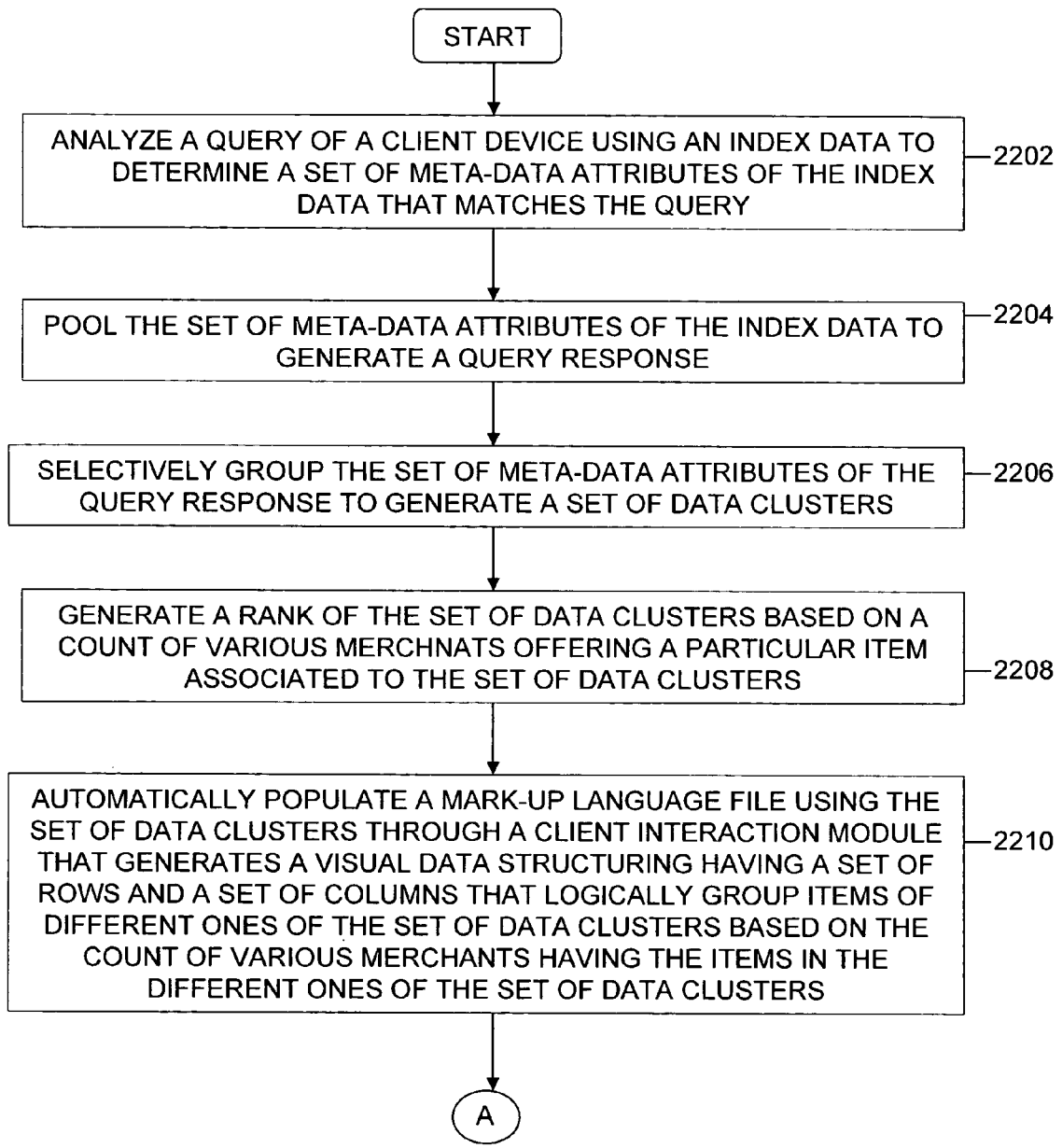
FIG. 22 is a flow chart illustrating a method to generate a query response based on a query of a client device, according to one embodiment.

FIG. 22 is a flow chart illustrating a method to generate a query response 1900 (e.g., as illustrated in FIG. 19) based on a query 1216 (e.g., the query 1216 of FIG. 12) of a client device 1206 (as illustrated in FIG. 12), according to one embodiment. In operation 2202, a query 1216 of a client device 1206 may be analyzed (e.g., by the data analyzer 1402 of FIG. 14) using an index data 1210 (e.g., the index data 1210 of FIG. 12) to determine a set of meta-data attributes 1512 of the index data 1210 that match the query 1216. In operation 2204, the set of meta-data attributes 1512 of the index data 1210 may be pooled (e.g., collected) to generate a query response 1900. In operation 2206, the set of meta-data attributes 1512 of the query response 1900 may be selectively grouped (e.g., by using grouping algorithms) to generate a set of data clusters 1902 (e.g., the set of data clusters 1902 of FIG. 19).

In operation 2208, a rank 1904 (e.g., as illustrated in FIG. 19) of the set of data clusters 1902 may be generated based on a count of various merchants 1912 (e.g., number of unique merchants) offering a particular item associated to the set of data clusters 1902. In operation 2210, a mark-up language file 1408 (e.g., the mark-up language file 1408 of FIG. 14) may be automatically populated using the set of data clusters 1902 through a client interaction module 1400 (e.g., the client interaction module 1400 of FIG. 14) that generates a visual data structuring having a set of rows and a set of columns (e.g., as illustrated in FIG. 19) that logically group items of different ones of the set of data clusters 1902 based on the count of various merchants 1912 (e.g., the count of various merchants 1912 of FIG. 19) having the items in the different ones of the set of data clusters 1902.

Figure 23:
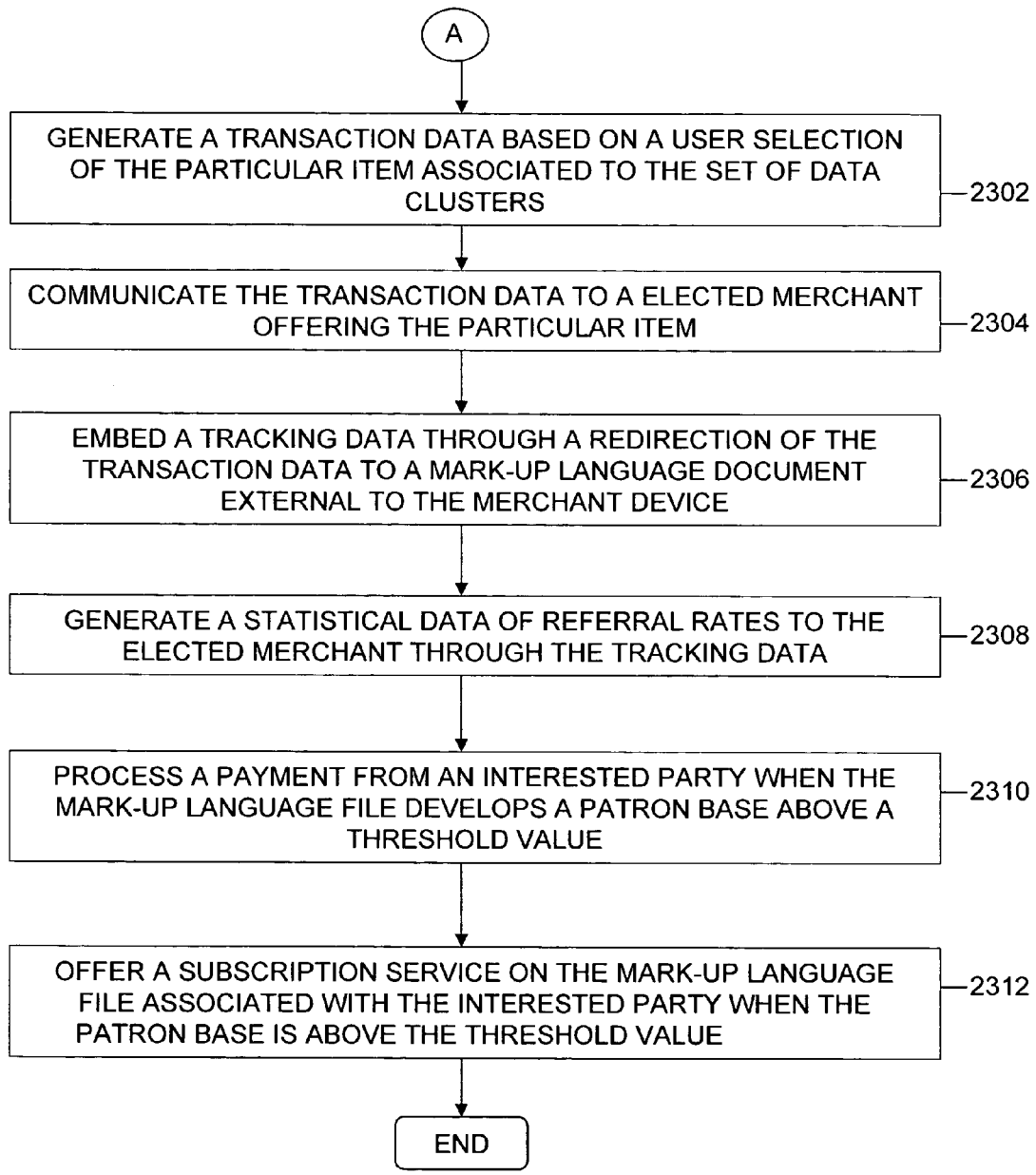
FIG. 23 is a process diagram that describes further the operations in FIG. 22, according to one embodiment.

FIG. 23 is a process diagram that describes further the operations of FIG. 22, according to one embodiment. FIG. 23 begins with a 'circle A' that connotes a continuation from operation 2210 of FIG. 22 (e.g., FIG. 22 concludes with the 'circle A'). First in operation 2302, a transaction data may be generated based on a user selection of a particular item associated to the set of data clusters (e.g., as described in FIG. 14). In operation 2304, the transaction data may be communicated to a elected merchant offering the particular item (e.g., as per the user selection). In operation 2306, a tracking data may be embedded through a redirection of the transaction data to a mark-up language document external to the merchant device 1204 (e.g., the merchant device 1204 of FIG. 12).

In operation 2308, a statistical data of referral rates 1806 (e.g., as illustrated in FIG. 18) to the elected merchant may be generated through the tracking data. In operation 2310, a payment may be processed from an interested party when the mark-up language file 1408 (e.g., the mark-up language file 1408 of FIG. 14) develops a patron base (e.g., a user base) above a threshold value (e.g., above a set minimum). In operation 2312, a subscription service 1808 (e.g., the subscription service 1808 of FIG. 18) may be offered on the mark-up language file 1408 associated with the interested party when the patron base is above the threshold value.

FIG. 24 is a user interface view of the structured catalog view 2400 of the catalog view generator module 1710 of FIG. 17 having a set of data classifiers 2402, a clustered representation 2404, a structured view of special offering data 2406, a price search data 2408, a count of individual merchants 2410 and/or a particular data classifier 2412, according to one embodiment. The set of data classifiers 2402 may be set of different categories (e.g., electronics, books, music, etc.) offered on the structured catalog view 2400 that a client can choose from to help locate and/or pick a particular offering based on the specification of the offering. The clustered representation 2404 may be a report and/or an analysis generated for a client based on a client selection of the particular offering.

The structured view of special offering data 2406 may be a report and/or an analysis of special deals pertaining to the client selection. For example, a client looking for a 40 Gb hard drive, may select a select the particular data classifier (e.g., 40 Gb) from the set of data classifiers 2402 (e.g., hdd). The client may then be presented with the clustered representation 2404 having an analysis table (e.g., including a rank, a manufacturer name, no. of matches, price range, etc.) for the 40 Gb hdd based on a clustering mechanism in which the rank depends on the count of individual merchants 2410 offering the 40 Gb hdd. A particular 40 Gb hard drive offered by the most number of individual merchants (e.g., 30 as shown for the 40 Gb hdd in the Figure) may show up first. The price search data 2408 may be a price data associated to various inventory items communicated by the merchant device 1702 to the catalog server device 1700. The count of individual merchants 2410 may be a tally (e.g., a sum) of unique merchants offering a particular item. The particular data classifier 2412 may be a particular specification (e.g., 40 Gb, 2.1 Ghz, etc.) within the set of data classifiers 2402.

Figure 25:
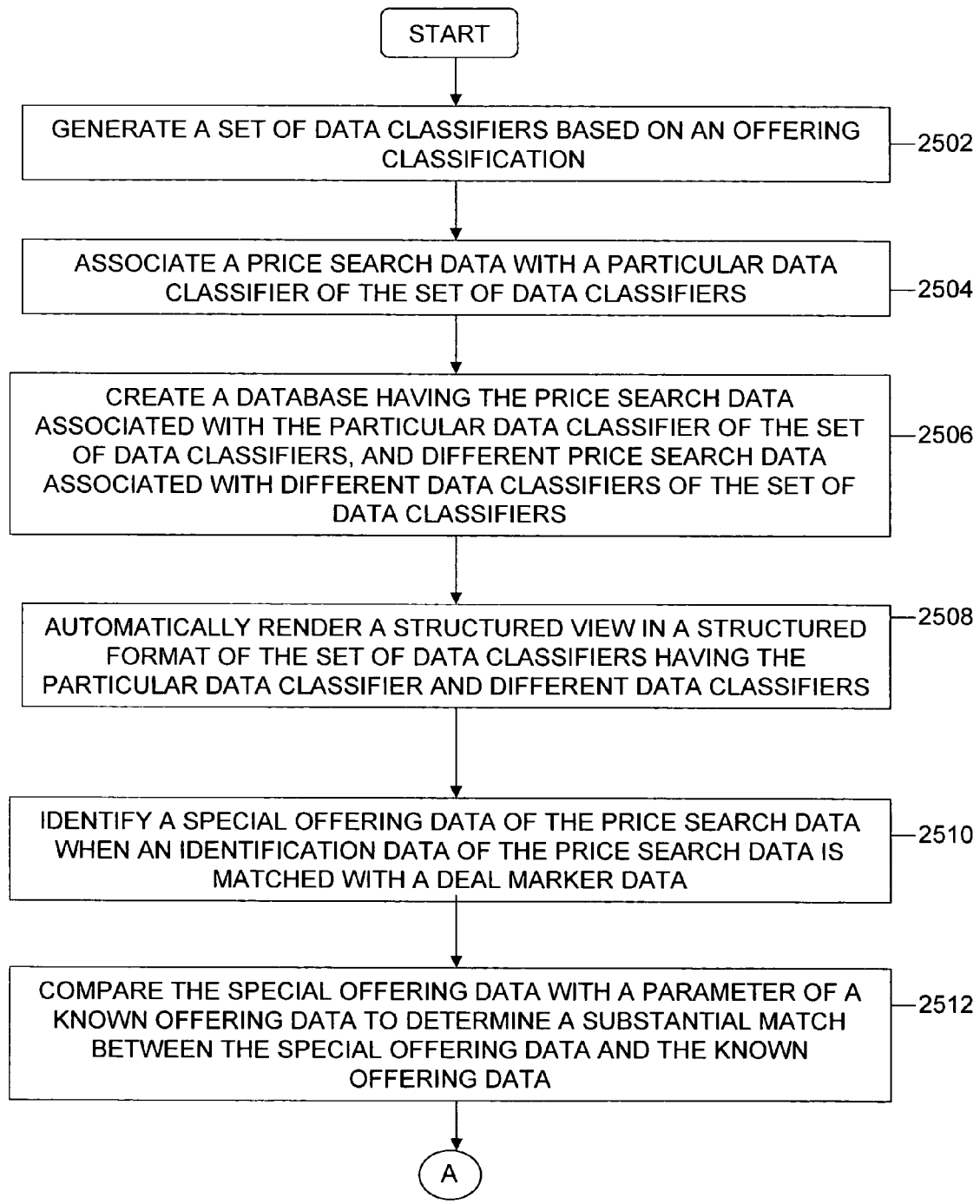
FIG. 25 is a flow chart illustrating a method to generate a structured catalog view of a set of data classifiers, according to one embodiment.

FIG. 25 is a flow chart illustrating a method to generate the structured catalog view 2400 (e.g., the structured catalog view 2400 of FIG. 24) of the set of data classifiers 2402, according to one embodiment. In operation 2502, the set of data classifiers (e.g., the set of data classifiers 2402 of FIG. 24) may be generated based on an offering classification (e.g., as described in the inventory data classification module 1708 of FIG. 17. In operation 2504, a price search data (e.g., the price search data 2408 of FIG. 24) may be associated with a particular data classifier (e.g., a particular specification) of the set of data classifiers (e.g., a collection of categories). In operation 2506, a database (e.g., a data-mart) may be created having the price search data associated with the particular data classifier of the set of data classifiers, and different price search data associated with different data classifiers of the set of data classifiers.

In operation 2508, a structured view (e.g., the structured catalog view 2400 of FIG. 24) may be automatically rendered in a structured format (e.g., by using the catalog view generator module 1710 of FIG. 17) of the set of data classifiers having the particular data classifier and the different data classifiers. In operation 2510, a special offering data (e.g., the special offering data 108 of FIG. 1) of the price search data (e.g., the price search data 2408 of FIG. 24) may be identified when an identification data (e.g., item description, item identifier, item brand, etc.) of the price search data is matched with a deal marker data (e.g., keywords, deal identification data, etc.). In operation 2512, the special offering data may be compared with a parameter (e.g., the parameters 516 of FIG. 5) of a known offering data (e.g., associated to the inventory database 210) to determine a substantial match between the special offering data and the known offering data.

Figure 26:
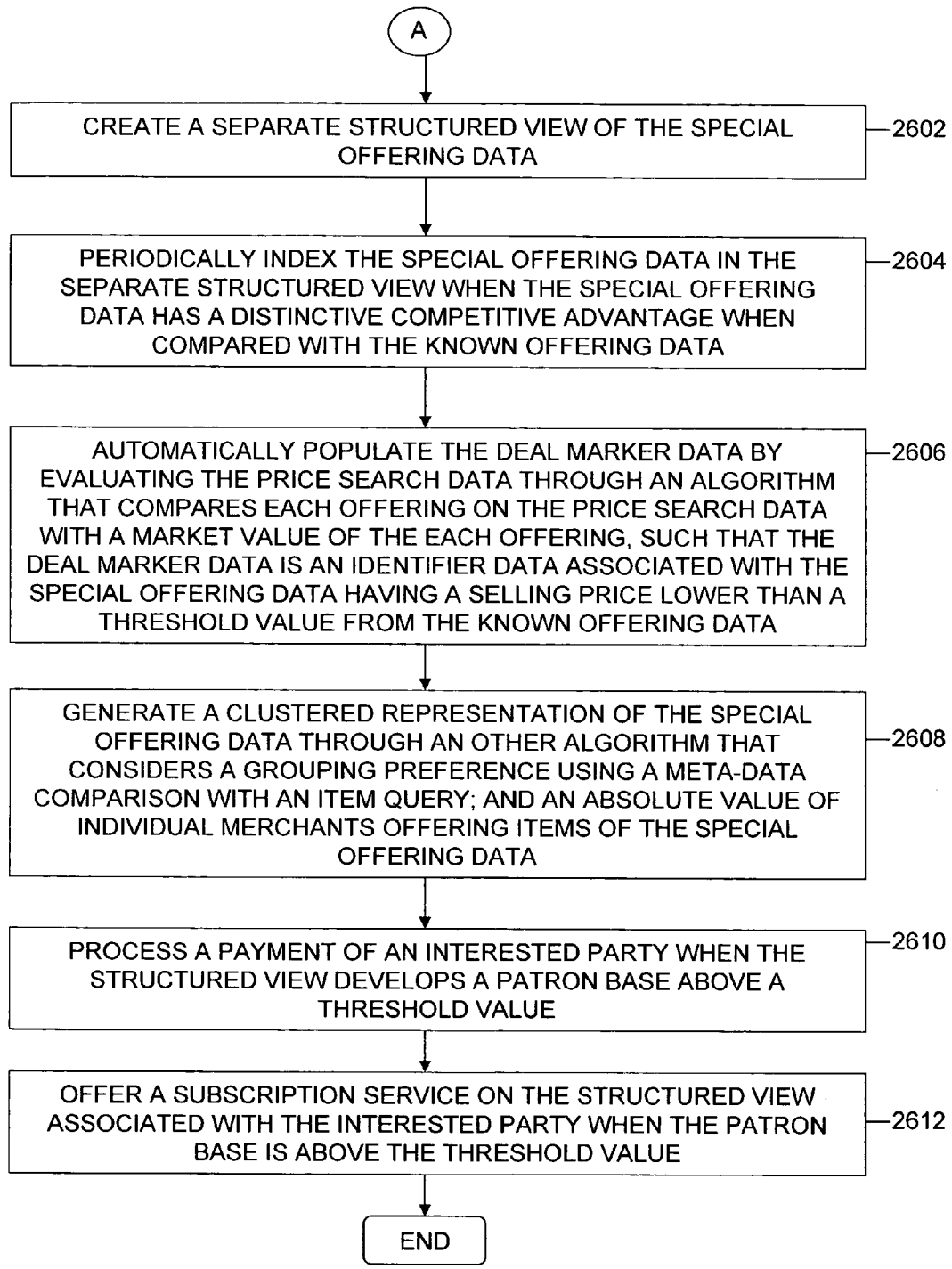
FIG. 26 is a process diagram that describes further the operations in FIG. 25, according to one embodiment.

FIG. 26 is a process diagram that describes further the operations in FIG. 25, according to one embodiment. FIG. 26 begins with a 'circle A' that connotes a continuation from operation 2512 of FIG. 25 (e.g., FIG. 25 concludes with the 'circle A'). First in operation 2602, a separate structured view (e.g., the structured view of the special offering data 2406 of FIG. 26) of the special offering data may be created (e.g., through the catalog view generator module 1710 of FIG. 17). In operation 2604, the special offering data (e.g., the special offering data 108 of FIG. 1) may be periodically indexed in the separate structured view when the special offering data has a distinctive competitive advantage (e.g., in terms of item price, item availability, item quality etc.) when compared with the known offering data.

In operation 2606, the deal marker data may be automatically populated (e.g., similar to as described in FIG. 2) by evaluating the price search data through an algorithm that compares each offering (e.g., data associated to each item) on the price search data with a market value (e.g., market price) of the each offering, such that the deal marker data is an identifier data (e.g., the identification data) associated with the special offering data having a selling price lower than a threshold value (e.g., a predetermined value) from the known offering data (e.g., known inventory data). In operation 2608, a clustered representation (e.g., the clustered representation 2404 of FIG. 24) of the special offering data may be generated through an algorithm (e.g., algorithms similar to algorithms 242 of FIG. 2) that considers a grouping preference using a meta-data comparison with the item query (e.g., as described by the clustering module 1212 of FIG. 12); and an absolute value of individual merchants (e.g., the count of individual merchants 2410 of FIG. 24) offering items of the special offering data.

In operation 2610, a payment of an interested party (e.g., a merchant, an advertisement agency, etc.) may be processed when the structured view (e.g., the structured catalog view 2400 of FIG. 24) develops a patron base (e.g., a user base, a following, etc.) above a threshold value (e.g., a set minimum). In operation 2612, a subscription service (e.g., the subscription service 1808 of FIG. 18) may be offered on the structured view associated with the interested party when the patron base is above the threshold value.

Figure 27:
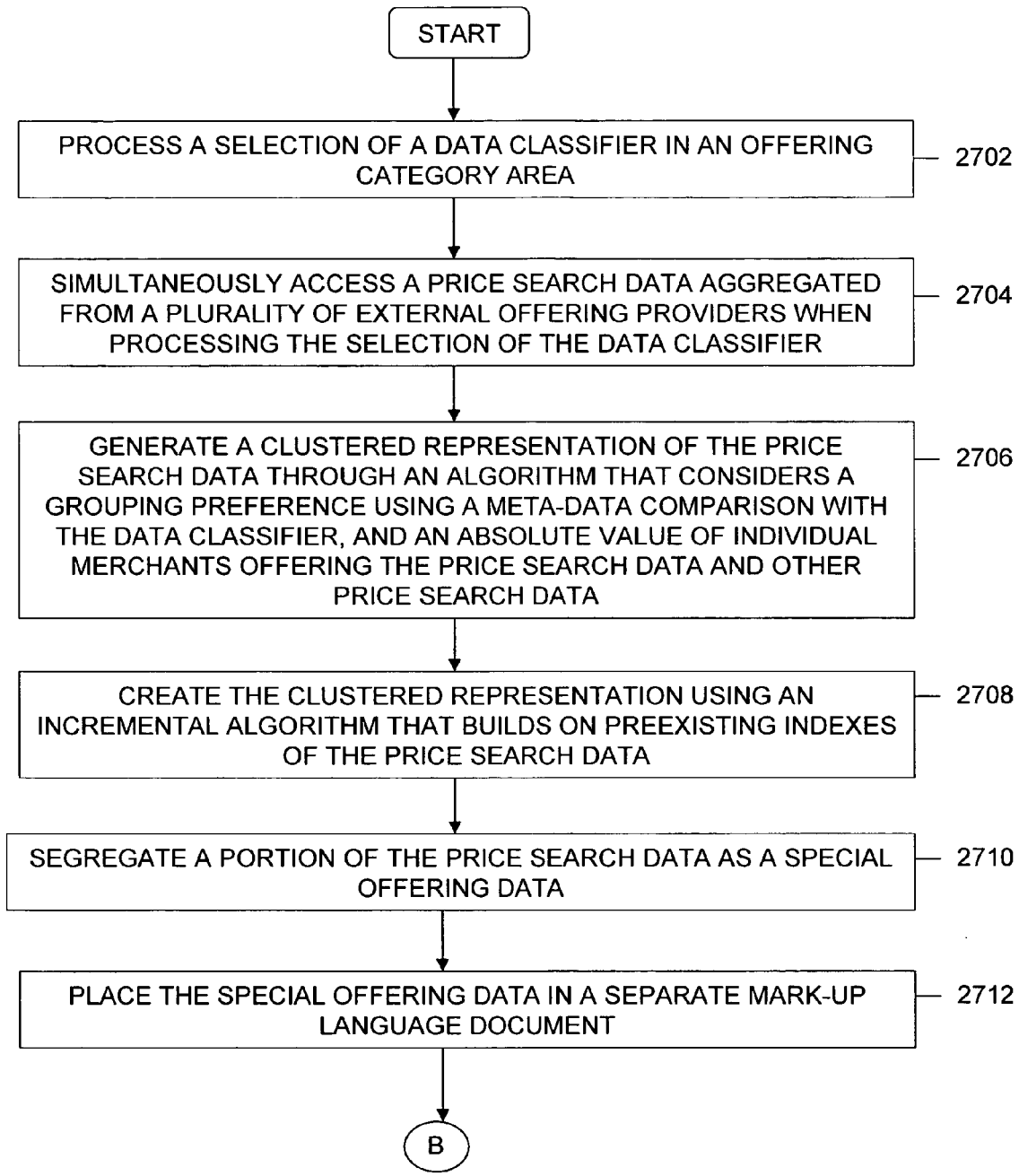
FIG. 27 is a flow chart illustrating a method to generate a clustered representation of a price search data, according to one embodiment.

FIG. 27 is a flow chart illustrating a method to generate a clustered representation of a price search data, according to one embodiment. In operation 2702, a selection (e.g., based on user choice) of a data classifier (e.g., the particular data classifier 2412 of FIG. 24) in an offering category area (e.g., area similar to the set of data classifiers 2402 of FIG. 24) may be processed (e.g., by using the processor 602 of FIG. 6). In operation 2704, a price search data aggregated from a plurality of external offering providers (e.g., similar to the merchant device 1702 of FIG. 17) may be simultaneously accessed when processing the selection of the data classifier. In operation 2706, a clustered representation (e.g., the clustered representation 2404 of FIG. 24) of the price search data may be generated through an algorithm that considers a grouping preference using a meta-data comparison with the data classifier, and an absolute value of individual merchants (e.g., the count of individual merchants 2410 of FIG. 24) offering the price search data and other price search data.

In operation 2708, the clustered representation may be created using an incremental algorithm that builds on preexisting indexes (e.g., an index having substantially similar data as the deal index 208 of FIG. 2) of the price search data. In operation 2710 a portion of the price search data may be segregated (e.g., separated) as a special offering data. In operation 2712 the special offering data may be placed in a separate mark-up language document (e.g., a web page).

Figure 28:
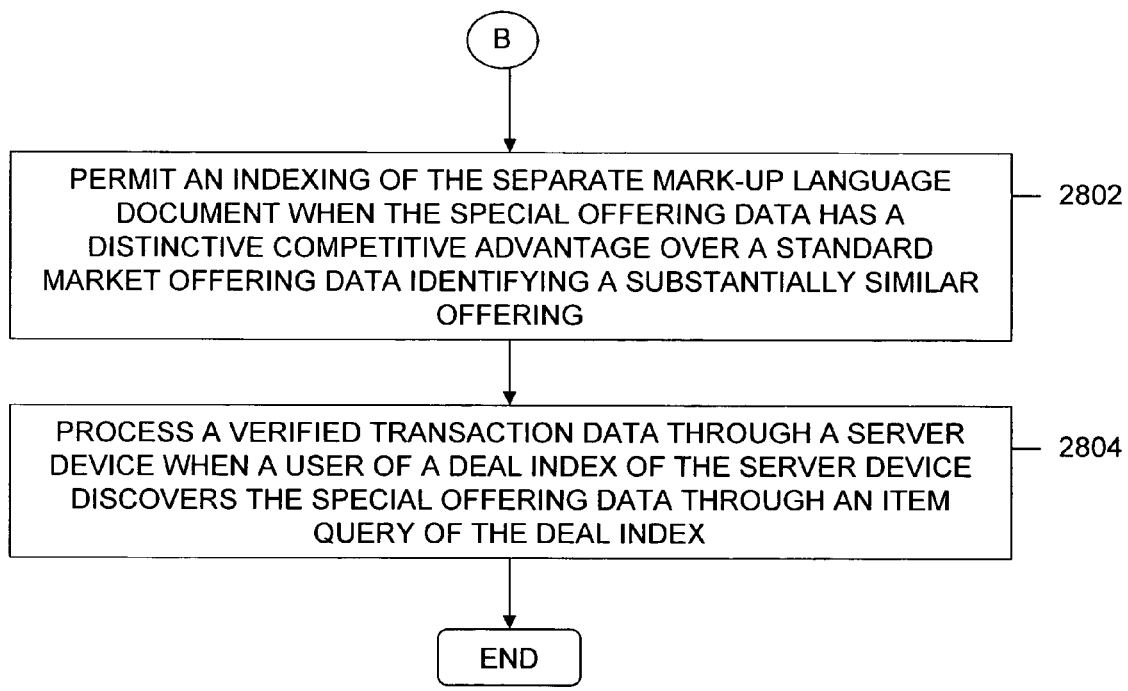
FIG. 28 is a process diagram that describes further the operations in FIG. 27, according to one embodiment.

FIG. 28 is a process diagram that describes further the operations in FIG. 27, according to one embodiment. FIG. 28 begins with a 'circle B' that connotes a continuation from operation 2712 of FIG. 27 (e.g., FIG. 27 concludes with the 'circle B'). First in operation 2802, an indexing of the separate mark-up language document may be permitted when the special offering data has a distinctive competitive advantage (e.g., in terms of item price, item availability, item quality etc.) over a standard market offering data (e.g., a comparable standard market item) identifying a substantially similar offering. In operation 2804, a verified transaction data may be processed through a server device (e.g., the catalog server device 1700 of FIG. 17) when a user of a deal index of the server device discovers the special offering data through an item query (e.g., posted by a user) of the deal index.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/ or software (e.g., embodied in a machine readable medium).

For example, the deal analysis module 200, the deal processing module 202, the query analysis module 204, the transaction module 206 (and all the modules in the deal analysis module 200, the deal processing module 202, the query analysis module 204, the transaction module 206 of FIG. 2), the inventory module 1208 (and all the modules in the inventory module 1208 as illustrated in FIG. 13) and/or the clustering module 1212 (and all the modules in the clustering module 1212 as illustrated in FIG. 14), may be enabled using transistors, logic gates, and electrical circuits (e.g., application specific integrated ASIC circuitry) using a deal analysis circuit, a deal processing circuit, a query analysis circuit, a transaction circuit, an inventory circuit and/or a clustering circuit.

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A method of a server device comprising:
periodically indexing a special offering data associated with a plurality of merchant devices when the special offering data has a distinctive competitive advantage when compared with a known offering data based on solely updating a non-redundant portion of a set of parameters associated therewith, at least a portion of the set of parameters being rendered redundant by a previous deal database, the special offering data being data classified as special by merchants related to the plurality of merchant devices and offering data equivalent to the special offering data unclassified by the merchants as special, and further analyzing the special offering data at the server device, the distinctive competitive advantage unique to an originator of a query analyzed through the server device, wherein, the catalog server further analyzes the special offering data by ranking the special offering data based on a data from the previous deal database and a verified transaction data concerning the originator of the query;
generating, through a catalog server, a set of data classifiers based on an inventory data associated with the plurality of merchant devices, the inventory data including the indexed special offering data;
processing a selection of a data classifier in an offering category area using a processor;
simultaneously accessing a price search data aggregated from the plurality of merchant devices when processing the selection of the data classifier; and
generating a clustered representation of the price search data through an algorithm that considers a grouping preference using a meta-data comparison with the data classifier, and an absolute value of individual merchants offering the price search data and other price search data;
segregating a portion of the price search data as the classified special offering data;
placing the classified special offering data in separate mark-up language documents associated with the plurality of merchant devices; and
indexing of the separate mark-up language documents when the classified special offering data has the distinctive competitive advantage over a standard market offering data identifying a similar offering; and
processing a verified transaction data through the server device when a user of a deal index of the server device discovers the special offering data through a query of the deal index;
associating a price search data with a particular data classifier of the set of data classifiers using a processor;
creating a database having the price search data associated with the particular data classifier of the set of data classifiers, and different price search data associated with different data classifiers of the set of data classifiers;
automatically rendering a structured view in a structured format of the set of data classifiers having the particular data classifier and different data classifiers; and
processing a payment of an interested party when the structured view develops a patron base above a threshold value; and offering a subscription service on the structured view associated with the interested party when the patron base is above the threshold value, wherein the subscription service is at least one of an advertisement space, a sponsored recommendation, and a web feature.

2. The method of claim 1, wherein the distinctive competitive advantage is at least one of a lower selling price, a faster shipping time, a larger available stock, a geographic proximity, a credibility rating, and a quality metric when compared to an industry benchmark.

3. The method of claim 1, further comprising creating the clustered representation using an incremental algorithm that builds on preexisting indexes of the price search data.

4. The method of claim 1, further comprising self-uploading the inventory data through the plurality of merchant devices.

5. The method of claim 2, further comprising periodically refreshing, through the server device, the industry benchmark based on an automatic comparison of the special offering data with the known offering data of the merchants related to the plurality of merchant devices.

6. The method of claim 1, further comprising comparing the special offering data with a parameter of the known offering data to determine a match therebetween.

* * * * *